(12) United States Patent
McPartlan et al.

(10) Patent No.: US 7,568,001 B2
(45) Date of Patent: Jul. 28, 2009

(54) ESCALATED HANDLING OF NON-REALTIME COMMUNICATIONS

(75) Inventors: Kevin McPartlan, Saratoga, CA (US); Justin Broughton, Alameda, CA (US)

(73) Assignee: Intervoice, Inc., Dallas, TX (US)

( * ) Notice: Subject to any disclaimer, the term of this patent is extended or adjusted under 35 U.S.C. 154(b) by 1006 days.

(21) Appl. No.: 10/633,018

(22) Filed: Jul. 31, 2003

(65) Prior Publication Data

US 2004/0054743 A1     Mar. 18, 2004

Related U.S. Application Data

(63) Continuation-in-part of application No. 09/774,944, filed on Jan. 30, 2001, now Pat. No. 7,254,641.

(60) Provisional application No. 60/404,076, filed on Aug. 16, 2002, provisional application No. 60/435,974, filed on Dec. 20, 2002.

(51) Int. Cl.
*G06F 15/16*     (2006.01)

(52) U.S. Cl. .................. 709/202; 709/207; 709/223

(58) Field of Classification Search ............... 709/202, 709/207, 223
See application file for complete search history.

(56) References Cited

U.S. PATENT DOCUMENTS 5,282,243 A    1/1994    Dabbaghi et al. ........... 379/201

(Continued)

FOREIGN PATENT DOCUMENTS

EP     1 016 998 A2     5/2000

(Continued)

OTHER PUBLICATIONS

Japanese Office Action (English Translation) issued for JP 2002-564928, dated Dec. 19, 2006.

(Continued)

*Primary Examiner*—Patrice Winder
(74) *Attorney, Agent, or Firm*—Fulbright & Jaworski L.L.P.

(57) ABSTRACT

A system and method of escalating non-realtime communications entering a Contact Center. The present invention removes communications that may initially be viewed as requiring deferred assistance, such as those near missing their SLA or those determined to require immediate handling based on identifying a particular important customer, from its shared file folders and "escalating" them to be routed as a live communications, for immediate response by a designated agent. An alternative tiered service model for a digital multimedia contact center assigns an entering contact to an initial immediate or deferred service tier based on routing criteria for the contact and may escalate or de-escalate the contact to a different service tier if the routing criteria changes. The service tier is initially determined based on a media type associated with the contact. The digital multimedia contact center contains a set of media servers, each of which passes a contact of a particular media type to a workflow engine (one for each service tier—immediate and deferred), which executes workflows to direct the processing of contacts at service tiers that require agent activity, for the immediate service tier contacts pass through a set of media routers. Agents are allocated to contacts by a dynamic automated contact distributor and the appropriate media router is used to route the contact to an agent. The workflow engines also execute workflows for agents to control the allocation of agents to contacts.

36 Claims, 22 Drawing Sheets

U.S. PATENT DOCUMENTS

| | | | | |
|---|---|---|---|---|
| 5,325,423 | A | 6/1994 | Lewis | 379/90 |
| 5,390,295 | A | 2/1995 | Bates et al. | 395/157 |
| 5,459,780 | A | 10/1995 | Sand | 379/265 |
| 5,488,411 | A | 1/1996 | Lewis | 348/8 |
| 5,491,795 | A | 2/1996 | Beaudet et al. | 395/159 |
| 5,530,744 | A | 6/1996 | Charalambous et al. | 379/265 |
| 5,612,730 | A | 3/1997 | Lewis | 348/8 |
| 5,613,068 | A | 3/1997 | Gregg et al. | 395/200.13 |
| 5,835,126 | A | 11/1998 | Lewis | 348/8 |
| 5,848,143 | A | 12/1998 | Andrews et al. | 379/219 |
| 5,903,642 | A | 5/1999 | Schwartz et al. | 379/309 |
| 6,046,741 | A | 4/2000 | Hochmuth | 345/348 |
| 6,046,762 | A | 4/2000 | Sonesh et al. | 348/16 |
| 6,049,603 | A | 4/2000 | Schwartz et al. | 379/309 |
| 6,094,479 | A | 7/2000 | Lindeberg et al. | 379/320 |
| 6,122,364 | A | 9/2000 | Petrunka et al. | 379/265 |
| 6,141,341 | A | 10/2000 | Jones et al. | 370/352 |
| 6,144,667 | A | 11/2000 | Doshi et al. | 370/401 |
| 6,188,673 | B1 | 2/2001 | Bauer et al. | 370/252 |
| 6,188,761 | B1 | 2/2001 | Dickerman et al. | 379/265 |
| 6,201,804 | B1 | 3/2001 | Kikinis | 370/352 |
| 6,212,565 | B1 | 4/2001 | Gupta | 709/229 |
| 6,219,648 | B1 | 4/2001 | Jones et al. | 705/8 |
| 6,225,998 | B1 | 5/2001 | Okita et al. | 345/356 |
| 6,266,058 | B1 | 7/2001 | Meyer | 345/339 |
| 6,289,001 | B1 | 9/2001 | Smyk | 370/216 |
| 6,298,383 | B1 | 10/2001 | Gutman et al. | 709/229 |
| 6,301,480 | B1 | 10/2001 | Kennedy, III et al. | 455/445 |
| 6,330,326 | B1 | 12/2001 | Whitt | 379/265.13 |
| 6,337,858 | B1 | 1/2002 | Petty et al. | 370/356 |
| 6,353,446 | B1 * | 3/2002 | Vaughn et al. | 715/733 |
| 6,366,577 | B1 | 4/2002 | Donovan | 370/352 |
| 6,377,568 | B1 | 4/2002 | Kelly | 370/352 |
| 6,389,426 | B1 * | 5/2002 | Turnbull et al. | 707/102 |
| 6,400,804 | B1 | 6/2002 | Bilder | 379/76 |
| 6,434,143 | B1 | 8/2002 | Donovan | 370/356 |
| 6,445,695 | B1 | 9/2002 | Christie, IV | 370/352 |
| 6,463,148 | B1 | 10/2002 | Brady | 379/265.01 |
| 6,493,695 | B1 | 12/2002 | Pickering et al. | 706/47 |
| 6,529,499 | B1 | 3/2003 | Doshi et al. | 370/352 |
| 6,542,475 | B1 | 4/2003 | Bala et al. | 370/271 |
| 6,574,218 | B1 | 6/2003 | Cooklev | 370/352 |
| 6,577,726 | B1 | 6/2003 | Huang et al. | 379/265.02 |
| 6,584,191 | B1 | 6/2003 | McPartlan et al. | 379/265.02 |
| 6,590,596 | B1 | 7/2003 | Rector | 345/810 |
| 6,600,735 | B1 | 7/2003 | Iwama et al. | 370/352 |
| 6,611,590 | B1 | 8/2003 | Lu et al. | 379/265.09 |
| 6,614,902 | B1 | 9/2003 | Rizzetto | 379/265.11 |
| 6,615,235 | B1 | 9/2003 | Copeland et al. | 709/203 |
| 6,639,982 | B1 | 10/2003 | Stuart et al. | 379/266.03 |
| 6,665,395 | B1 | 12/2003 | Busey et al. | 379/265.09 |
| 6,674,713 | B1 | 1/2004 | Berg et al. | 370/217 |
| 6,678,265 | B1 | 1/2004 | Kung et al. | 370/352 |
| 6,678,718 | B1 | 1/2004 | Khouri et al. | 709/204 |
| 6,687,251 | B1 | 2/2004 | Mousseau et al. | 370/401 |
| 6,697,858 | B1 | 2/2004 | Ezerzer et al. | 709/224 |
| 6,704,409 | B1 | 3/2004 | Dilip et al. | 379/265.02 |
| 6,704,412 | B1 | 3/2004 | Harris et al. | 379/269 |
| 6,724,884 | B2 | 4/2004 | Jensen et al. | 379/265.01 |
| 6,741,698 | B1 | 5/2004 | Jensen | 379/265.02 |
| 6,763,333 | B2 * | 7/2004 | Jones et al. | 705/8 |
| 6,766,377 | B1 | 7/2004 | Grabelsky et al. | 709/238 |
| 6,771,765 | B1 | 8/2004 | Crowther et al. | 379/265.09 |
| 6,778,494 | B1 | 8/2004 | Mauger | 370/230 |
| 6,781,959 | B1 | 8/2004 | Garakani et al. | 370/242 |
| 6,823,382 | B2 | 11/2004 | Stone | 709/224 |
| 6,850,599 | B2 | 2/2005 | Yoshitani | 379/37 |
| 6,850,613 | B2 | 2/2005 | McPartlan et al. | 379/265.02 |
| 6,868,059 | B1 | 3/2005 | Jones et al. | 370/216 |
| 6,937,715 | B2 | 8/2005 | Delaney | 379/265.09 |
| 7,035,252 | B2 | 4/2006 | Cave et al. | 370/356 |
| 7,085,263 | B1 | 8/2006 | Fitzgerald | 370/352 |
| 7,086,062 | B1 * | 8/2006 | Faour et al. | 718/106 |
| 7,225,139 | B1 * | 5/2007 | Tidwell et al. | 705/8 |
| 2001/0024997 | A1 | 9/2001 | Sugano et al. | 477/2 |
| 2002/0071541 | A1 | 6/2002 | Cheung et al. | 379/215.01 |
| 2002/0123983 | A1 * | 9/2002 | Riley et al. | 707/1 |
| 2003/0018702 | A1 | 1/2003 | Broughton et al. | 709/202 |
| 2003/0074270 | A1 * | 4/2003 | Brown et al. | 705/26 |
| 2003/0133558 | A1 | 7/2003 | Kung et al. | 379/215.01 |
| 2003/0195753 | A1 | 10/2003 | Homuth | 705/1 |
| 2004/0054743 | A1 | 3/2004 | McPartlan et al. | 709/206 |
| 2004/0066923 | A1 | 4/2004 | Robinson | 379/166 |
| 2004/0141508 | A1 | 7/2004 | Schoeneberger et al. | 370/401 |
| 2004/0221053 | A1 | 11/2004 | Codella et al. | 709/231 |

FOREIGN PATENT DOCUMENTS

| | | |
|---|---|---|
| EP | 1 016 998 | 7/2000 |
| EP | 1 032 188 | 8/2000 |
| JP | 11-234408 | 8/1999 |
| JP | 11-266306 | 9/1999 |
| JP | 2000-244568 | 9/2000 |
| WO | WO 99/65214 | 12/1999 |
| WO | WO 01/35601 A1 | 5/2001 |
| WO | WO 01/35601 A2 | 8/2001 |

OTHER PUBLICATIONS

Office Action from foreign counter-part Canadian Application No. 2,434,922 dated Sep. 27, 2006.

"Signaling Gateway CX6100-SG," Harasaki et al., NEC Res & Develop., vol. 42, No. 2, Apr. 2001, pp. 138-142.

"Media Gateway CX3200", Ichikawa et al., NEC Res & Develop, vol. 42, No. 2, Apr. 2001, pp. 133-137.

"*Message Classification in the Call Center*", by Stephan Busemann, Sven Schmeier, and Roman G. Arens. Published in Saarbrucken, Germany, pp. 158-165.

"*The Modernization of a Call Center*", by Karen Reasoner, University of Wyoming, Client Support Services, Information Technology, Laramie WY. 82070, pp. 270-273.

"*Redefining the Call Center: Customer Service on the Internet*", by D. Steul from San Francisco, Ca., pp. 38-42.

"Declaration of Kevin McPartlan", 2 pages.

Dr. D. E. Brown, "The Interaction Center Platform™", Interactive Intelligence, Apr. 6, 2001, pp. 1 of 31.

M. Taylor, "Integrated Versus Unified CTI—What's the Difference?", Interactive Intelligence http://www.inin.com/news/presscoverage/presscoverage.asp?id=14, Aug. 2, 2001, pp. 1 of 9.

CosmoCom, "CosmoCall Universe™ Technology Overview", http://www.cosmocom.com/Productinfo/techover.htm, Aug. 2, 2001, pp. 1 of 3.

"Using SNMP to Manage Your Call Center Efficiently", 2001 Aspect.

* cited by examiner

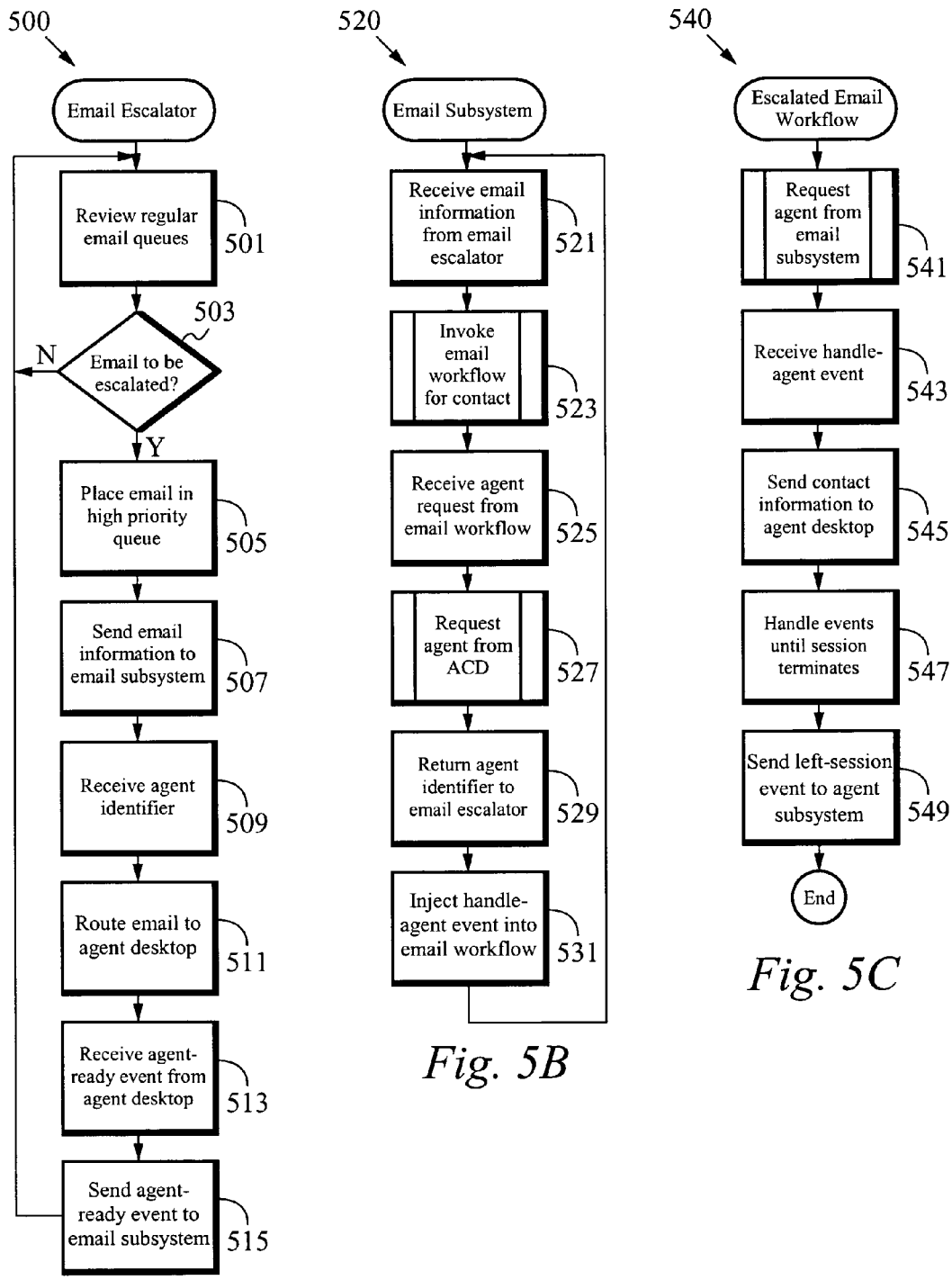

ESCALATED HANDLING OF NON-REALTIME COMMUNICATIONS

RELATED APPLICATION(S)

This Patent Application claims priority under 35 U.S.C. §120 as a continuation-in-part of the U.S. patent application Ser. No. 09/774,944, filed Jan. 30, 2001 now U.S. Pat. No. 7,254,641, and entitled "DIGITAL MULTIMEDIA CONTACT CENTER". The co-pending U.S. patent application Ser. No. 09/774,944, filed Jan. 30, 2001, and entitled "DIGITAL MULTIMEDIA CONTACT CENTER" is also hereby incorporated by reference in its entirety.

This Patent Application claims priority under 35 U.S.C. §119(e) of the co-pending U.S. Provisional Patent Application Ser. No. 60/404,076, filed Aug. 16, 2002, and entitled "YOSEMITE ARCHITECTURE SPECIFICATION". The Provisional Patent Application Ser. No. 60/404,076, filed Aug. 16, 2002, and entitled "YOSEMITE ARCHITECTURE SPECIFICATION" is also hereby incorporated by reference in its entirety.

This Patent Application claims priority under 35 U.S.C. §119(e) of the co-pending U.S. Provisional Patent Application Ser. No. 60/435,974, filed Dec. 20, 2002, and entitled "YOSEMITE ARCHITECTURE SPECIFICATION II". The Provisional Patent Application Ser. No. 60/435,974, filed Dec. 20, 2002, and entitled "YOSEMITE ARCHITECTURE SPECIFICATION II" is also hereby incorporated by reference in its entirety.

The co-pending and co-owned U.S. patent application Ser. No. 10/327,360, filed Dec. 20, 2002, and entitled "REMOTE AGENT ACCESS METHOD TO A VOIP CONTACT CENTER WHERE HIGH QOS IS NOT SUPPORTED" is also hereby incorporated by reference in its entirety.

The co-pending, co-owned and co-filed U.S. patent application Ser. No. 10/632,649, filed Jul. 31, 2003, and entitled "HIGH AVAILABILITY VOIP SUBSYSTEM" is also hereby incorporated by reference in its entirety.

The co-pending, co-owned and co-filed U.S. patent application Ser. No. 10/633,250, filed Jul. 31, 2003, and entitled "AUTOMATIC MANAGEMENT OF THE VISUAL SPACE WHILE PERFORMING A TASK" is also hereby incorporated by reference in its entirety.

The co-pending, co-owned and co-filed U.S. patent application Ser. No. 10/632,617, filed Jul. 31, 2003, and entitled "GRAPHICAL CONTROL FOR SIMULTANEOUSLY EDITING AN ARRAY OF VALUES THAT SUM TO A FIXED VALUE" is also hereby incorporated by reference in its entirety.

FIELD OF THE INVENTION

The present invention relates generally to the field of Contact Centers. More specifically, the present invention relates to the field of handling non-realtime communication with customers in a Contact Center that processes contacts having different media types.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 1999-2002, NUASIS Corporation, All Rights Reserved

BACKGROUND OF THE INVENTION

In Contact Centers, when a non-realtime communication such as fax, voicemail, email or callback request (hereinafter referred to collectively as "communications") may have already been handled by an automated system, and then must be subsequently handled by a real person, the communications may be distributed by letting the agents pick from shared file folders of these communications and work on those they choose. Alternatively, the work may be given one or more at a time to agents for them to complete. Both of these methods have advantages and disadvantages. Work that comes from shared file folders allows agents of varying skill levels to pick communications to answer that they are competent to handle. Presumably, the newer agents are instructed to answer what they can, and the experienced agents are told to leave the "easy ones" alone and work on the more complex communications. This method is very efficient in its use of an agent's available time. However, it can lead to a surplus of communications that no one handles and can cause customer dissatisfaction because of delayed responses.

Normally a service level agreement (SLA) exists that requires the Contact Center to meet a goal such as "all emails must receive a response within ½ of a business day," or "all callbacks must be completed within 2 hours and before the Contact Center is closed for the end of the day." When communications are presented one or more at a time to the agents, often work is presented that could be done more efficiently by others because either the agent is more experienced and could be leaving an easier email for another, or the agent is inexperienced and not competent to handle the communication presented, causing them to redirect the email to a supervisor for assistance. Therefore, the first method is more efficient but could lead to SLA violations and the second method controls the SLA but requires more labor overall to handle the workload.

Contact centers are typically used by organizations to service customers. Traditionally, customers called into a contact center using a telephone but more and more organizations are implementing other types of media access such as mail, voice mail, web browsing, etc. to expand the ways by which their customers may contact them. Current attempts to integrate the different media into a single call center have proved ineffective because of the complexity of the various media channels and because the adoption of their use occurred at different times, so most products were poorly integrated out of several different incompatible designs. Telephone oriented ACD is very different than an email or a web collaboration session. Additionally, the response time expected by the customer varied depending on the media type used.

One approach processes a contact based on its media type. This approach ignores the fact that the same customer is treated differently based on their method of contact. For example, a customer that sends an email to a support group may have to wait for assistance longer than calling the same company's support telephone number. Another approach is to handle all contacts identically, regardless of media type in a "Universal Queue." This "Universal Queue" approach fails to account for the magnitude of contacts and different expected response times for a customer independent of the various media types. For example, tens or hundreds of phone contacts may be received in a day whereas thousands of email messages may be received for the same day. Thus, a call center that processes all contacts as requiring an immediate response quickly becomes overloaded with emails that could have been answered with off peak labor. Furthermore, both of these approaches involve extensive modifications to the systems that underlie the call center, such as the email system, the telephony system, etc., so that the many of the original features and benefits of the underlying systems are lost. Additionally, while some previous implementations appear to integrate analog contacts, such as voice calls, and digital contacts, such as email, the actual processing of the two types of contacts is separated.

What is needed is a system that processes and prioritizes non-realtime contacts and realtime contacts separately and in parallel. What is needed to accomplish this is a system and method of handling and distributing non-realtime communications in a Contact Center when agents of various skill levels are assigned communications from a group of communications of various types such as "sales," "accounts payable" or "service," in a "Universal Queue" for non-realtime communications based on customer requirements rather than routing based on media type.

SUMMARY OF THE INVENTION

A system and method of escalating non-realtime communications entering a Contact Center. The present invention removes communications that may initially be viewed as requiring deferred assistance, such as those near missing their SLA or those determined to require immediate handling based on identifying a particular important customer, from its shared file folders and "escalating" them to be routed as live communications, for immediate response by a designated agent. An alternative tiered service model for a digital multimedia contact center assigns an entering contact to an initial immediate or deferred service tier based on routing criteria for the contact and may escalate or de-escalate the contact to a different service tier if the routing criteria changes. The service tier is initially determined based on a media type associated with the contact. The digital multimedia contact center contains a set of media servers, each of which passes a contact of a particular media type to a workflow engine (one for each service tier—immediate and deferred), which executes workflows to direct the processing of contacts at service tiers that require agent activity. For the immediate service tier contacts pass through a set of media routers, agents are then allocated to contacts by a dynamic automated contact distributor and the appropriate media router is used to route the contact to an agent. The workflow engines also execute workflows for agents to control the allocation of agents to contacts.

A method of escalating non-realtime communications in a contact center comprising the steps of extracting an aged communication from a plurality of shared file folders, wherein the plurality of shared file folders are configured in a central processing are of the contact center, and further wherein a communication is designated as aged based on predetermined escalation criteria, routing the aged communication with an escalation service to an immediate workflow such that the aged communication is routed by the immediate workflow for immediate response to a first designated agent, presenting the aged communication to the first designated agent such that the aged communication is displayed on a desktop of the first designated agent and responding to the aged communication, wherein the first designated agent answers the aged communication on the desktop, wherein a deferred workflow routes an immediate communication to the immediate workflow for routing to the first designated agent.

The method of the present invention also includes monitoring the aged communication displayed on the first designated agent's desktop, wherein when the first designated agent does not answer the aged communication, the immediate workflow routes the aged communication to a second designated agent and prompting the first designated agent when the step of responding does not occur within a predetermined timeout period after the step of presenting, wherein the aged communication is routed to the second designated agent after the prompting step is unanswered by the first designated agent and the aged communication is routed to the second designated agent after the first designated agent answers the prompting step by declining to respond to the aged communication.

The method of the present invention also includes the predetermined escalation criteria being variable such that the predetermined escalation will change during the responding step, and further wherein the non-realtime communication is distributed to the central processing area, the first and second designated agents selecting non-realtime communications from the plurality of shared file folders that are not designated as aged, and further wherein the first and second designated agents respond to those non-realtime communications not designated as aged and an agent being designated based on predetermined designation criteria.

A system for escalating non-realtime communications in a contact center comprising means for extracting an aged communication from a plurality of shared file folders, wherein the plurality of shared file folders is configured in a central processing area of the contact center, and further wherein a communication is designated as aged based on predetermined escalation criteria, means for routing the aged communication with an escalation service to an immediate workflow such that the aged communication is routed by the immediate workflow for immediate response to a first designated agent, means for presenting the aged communication to the first designated agent such that the aged communication is displayed on a desktop of the first designated agent and means for responding to the aged communication, wherein the first designated agent answers the aged communication on the desktop, wherein a deferred workflow routes an immediate communication to the immediate workflow for routing to the first designated agent.

The system of the present invention also includes means for monitoring the aged communication displayed on the first designated agent's desktop, wherein when the first designated agent does not answer the aged communication, the immediate workflow routes the aged communication to a second designated agent and means for prompting the first designated agent when the means for responding are not activated within a predetermined timeout period after the means for presenting display the aged communication on the desktop of the first designated agent, wherein the aged communication is routed to the second designated agent after the means for prompting is unanswered by the first designated agent and the aged communication is routed to the second designated agent after the first designated agent answers the means for prompting by declining to respond to the aged communication.

The system of the present invention also includes the predetermined escalation criteria being variable such that the predetermined escalation will change when the means for responding are activated, the first and second designated agents selecting non-realtime communications from the plurality of shared file folders that are not designated as aged, and further wherein the first and second designated agents respond to those non-realtime communications not designated as aged and an agent being designated based on predetermined designation criteria.

A system of escalating a non-realtime communication in a contact center comprising a plurality of shared file folders where the non-realtime communication is received and stored, wherein the plurality of shared file folders are configured in a central processing area of the contact center, and further wherein an aged communication is extracted from the plurality of shared file folders based on predetermined escalation criteria, an escalation service coupled with the plurality of shared file folders such that the escalated service routes the aged communication to an immediate workflow and a plurality of designated agents such that the aged communication is displayed on a desktop of a first designated agent after receiving the aged communication from the immediate workflow, wherein the first designated agent provides an immediate response to the aged communication on the desktop, and further wherein a deferred workflow routes an immediate communication to the immediate workflow for routing to the first designated agent.

The system of the present invention also includes a second designated agent, wherein when the first designated agent does not answer the aged communication, the immediate workflow routes the aged communication to the second designated agent and the first designated agent is prompted when the first designated agent does not respond within a predetermined timeout period after the aged communication is displayed on the desktop, wherein the aged communication is routed to the second designated agent after the first designated agent does not answer the prompt and the aged communication is routed to the second designated agent after the first designated agent answers the prompt by declining to respond to the aged communication.

The system of the present invention also includes the predetermined escalation criteria being variable such that the predetermined escalation will change while the first designated agent responds to the aged communication, the first and second designated agents selecting non-realtime communications from the plurality of shared file folders that are not designated as aged, and further wherein the first and second designated agents respond to those non-realtime communications not designated as aged and an agent being designated based on predetermined designation criteria.

An apparatus for escalating non-realtime communications in a contact center comprising a storage media for storing a computer application, a processing unit coupled to the storage media and a user interface coupled to the processing unit such that a plurality of users can receive an aged communication from an immediate workflow through an escalation service, wherein the plurality of users can provide an immediate response to the aged communication, and further wherein the immediate workflow can receive an immediate communication from a deferred workflow for routing to the plurality of users.

A tiered service model for a digital multimedia contact center assigns an entering contact to an initial service tier based on routing criteria for the contact and may escalate or de-escalate the contact to a different service tier if the routing criteria changes. The routing criteria is initially determined based on a media type associated with the contact. The digital multimedia contact center contains a set of media routers, each of which passes a contact of a particular type to a workflow engine. The workflow engine starts a workflow for the contact and calls a dynamic automatic contact distributor to allocate an agent to the contact if the service tier of the contact requires agent activity. The workflow engine returns an identifier for the allocated agent to the media router, which then routes the contact to an agent desktop for the agent. The agent desktop presents the contact to the agent for processing. The workflow engine also creates a workflow for an agent to control the allocation of the agents to contacts.

The digital multimedia contact center operates in conjunction with existing systems dedicated to a particular media type without requiring major modifications to those systems. For example, emails are generally handled at one service tier by the standard operations of a conventional email system unless specially marked in the email system as having been escalated to a higher service tier. Similarly, voice calls are initially assigned to a high service tier for handling by an agent but can be de-escalated to a lower service tier and routed to an existing interactive voice response system if appropriate. Thus, the digital multimedia contact center handles contacts in accordance with the contact's required level of service instead of relying primarily on the media type to determine the necessary processing. Furthermore, the digital multimedia contact center implements the most appropriate processing methodology for the number of contacts expected at each service tier.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

FIGS. 5a-5c are flowcharts of methods to be performed by by escalated email components in the embodiment of the digital multimedia contact center shown in FIG. 2.

FIG. 9b is a diagram of an asynchronous workflow executed by the workflow engine of FIG. 9a.

FIG. 10b is a diagram of one embodiment of a computer system suitable for use in the operating environment of FIG. 10a.

DETAILED DESCRIPTION OF THE PREFERRED EMBODIMENT

The preferred embodiment of the present invention is a system and method of escalating communications in a Contact Center, preferably a Contact Center having a hub and node architecture. The details concerning the Contact Center of the preferred embodiment of the present invention are disclosed in a co-owned and co-pending U.S. patent application, Ser. No. 10/632,615, entitled CONTACT CENTER ARCHITECTURE. The U.S. patent application Ser. No. 10/632,615, entitled CONTACT CENTER ARCHITECTURE is also incorporated by reference in its entirety. Of course, it will be readily apparent to one skilled in the art that alternative embodiments of the present invention disclosed in the following specification can and will be utilized in VoIP networks other than the Contact Center incorporated by reference above.

Figure 11A:
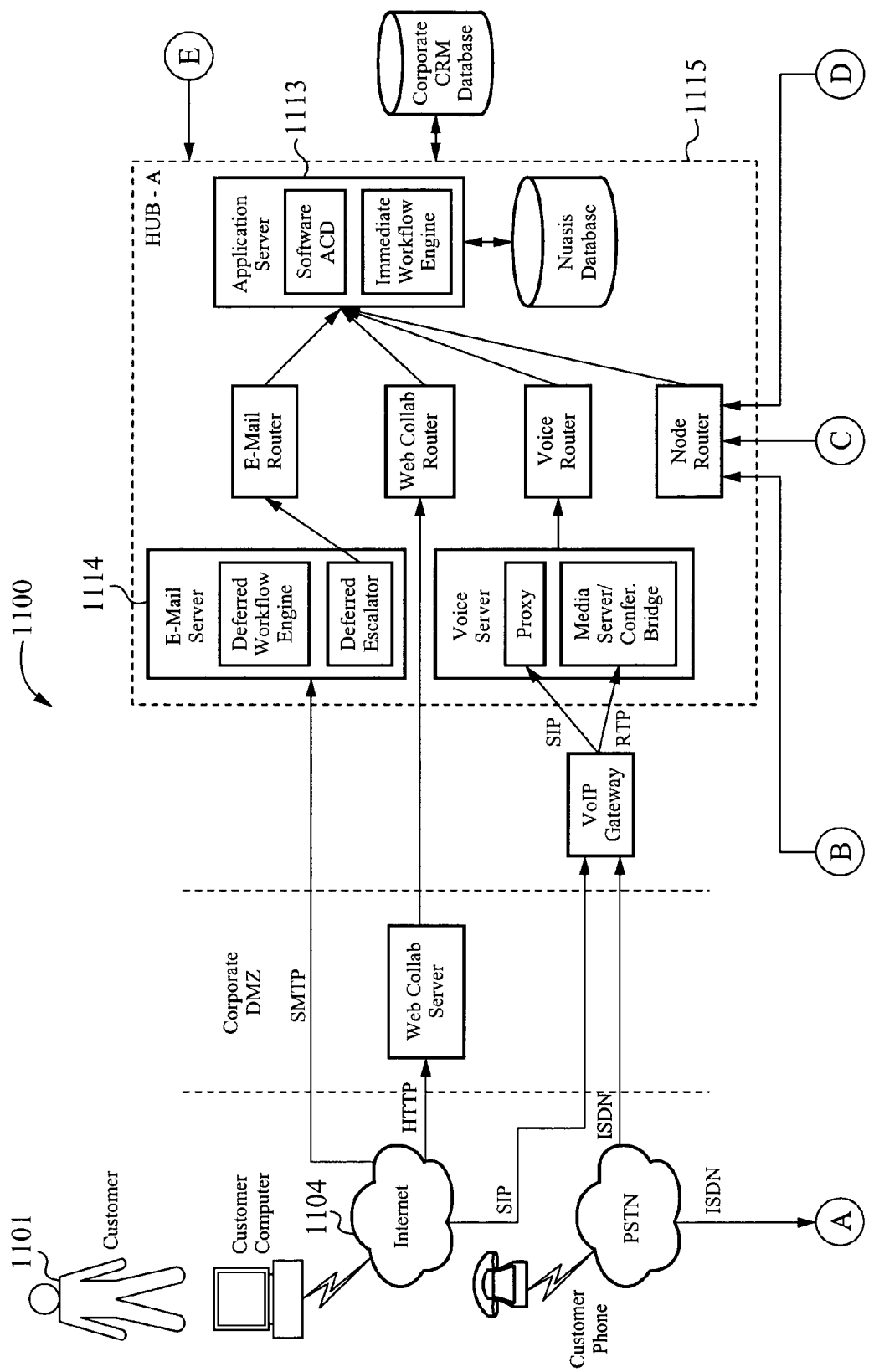
FIGS. 11a-11c illustrate a graphical representation of a Contact Center architecture of the preferred embodiment of the present invention.
Figure 11B:
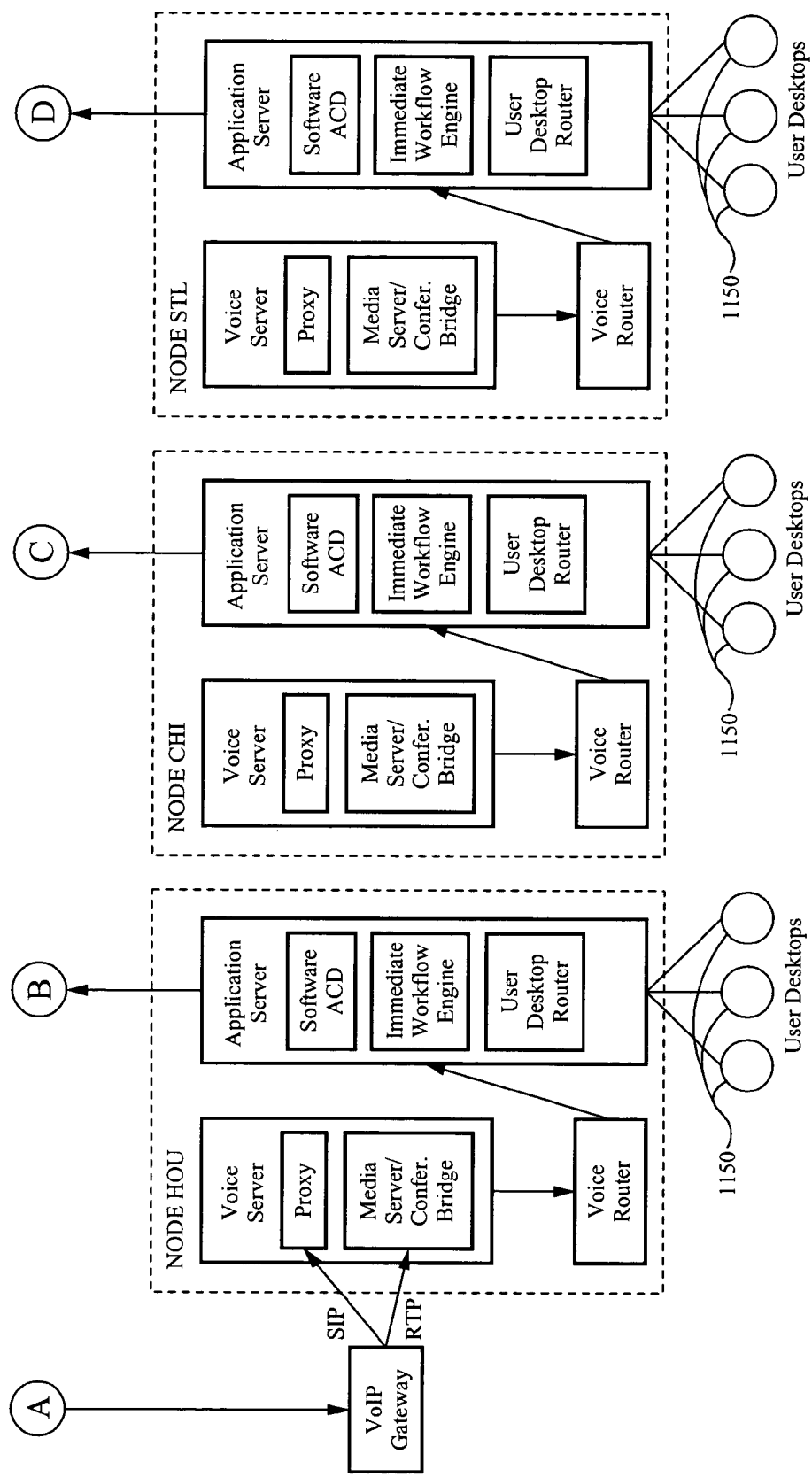
Figure 11C:
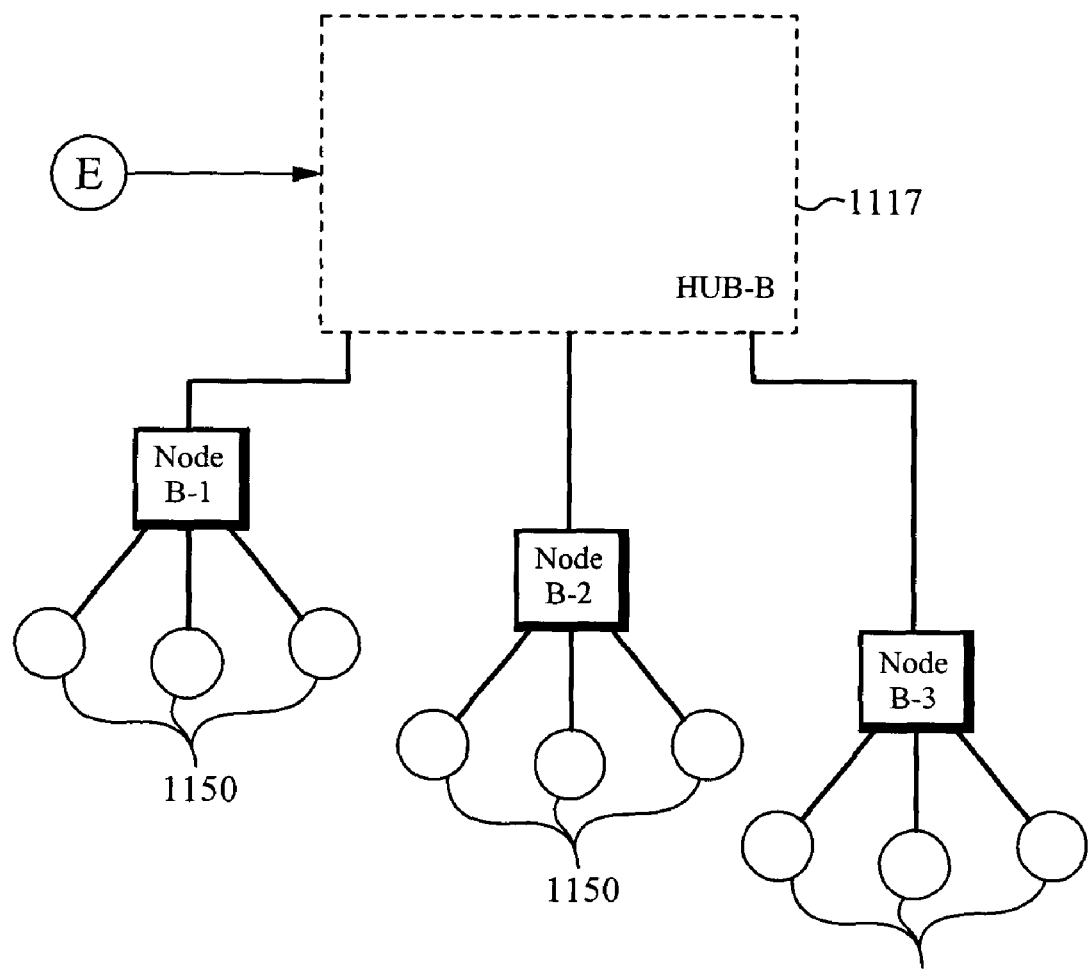

In the preferred embodiment of the present invention, the Contact Center 1100 depicted in FIGS. 11a-11c is preferably used to implement the present invention. Contacts 1101 access the Contact Center 1100 through the Internet 1104 using any type of personal computer or other personal internet interface 1102 connected to the Internet 1104. The Contacts 1101 are routed to appropriate Agents 1150 by the Hubs 1115, 1117 and Nodes (Node CHI, Node STL, Node HOU, Node B-1, Node B-2. Node B-3), so that the Agents 1150 may assist the Contacts 1101 with a variety of goods and services, depending on the particular Contact Center 1100. Likewise, other realtime customer contacts such as chat and web collaboration requests are also routed to the Agents 1150 in this manner. For simplicity in explanation, all of these possible contact types will be referred to as "communications" in describing the preferred embodiment of the present invention.

Referring again to FIGS. 11a-11c, the preferred embodiment of the present invention is a hybrid approach that places incoming non-realtime communications in a deferred workflow, which will transfer communications having immediate service tier requirement such as communications from a preferred (e.g. "Platinum") customer or some other immediate service tier requirement to an immediate workflow, where the communication will be routed to designated Agents 1150. Those communications not having immediate assistance requirements are placed in shared file folders in the particular Hub (Hub-A, Hub-B) for which the communication is assigned for Agents 1150 to pick from, and when that communication is nearing it's SLA limits, e.g., a callback having a one hour SLA limit might be at fifty minutes, the communication is escalated to the immediate workflow. It should be noted that each media type, e.g., email, fax, voicemail callback request, etc., may have different SLA requirements, so the escalation could typically occur at different times depending on the media. Further, when an Agent 1150 is not actively interacting with a contact via a voice, video, or web collaboration call, they can be working on background actions such as responding to email, voicemail or FAX. In some cases this may happen concurrently during a live call or web chat session; perhaps due to the caller's lengthy wait periods during the contact session, such as a support desk waiting for a customer to reboot a PC, etc. This means that an Agent 1150 can be working on several things at once, and on work that is as difficult as they feel they are capable, while the operator of the Contact Center 1100 knows that if a communication ages to the point of nearing the SLA, it will be escalated.

Still referring to FIGS. 11a-11c, when the communication is escalated, it is presented to the Agent 1150 as an exclusive piece of work to be completed immediately and will not be interrupted with any live contact. However, only certain Agents 1150 as designated by the operator of the Contact Center 1100, may be assigned such an escalated communication. The concept of designated Agents 1150 will be discussed in greater detail below. The Agent 1150 is expected to answer the communication immediately without accepting additional work, just as they would if a new live communication was presented to them. This permits the Contact Center 1100 to operate at the highest possible efficiency.

Still referring to FIGS. 11a-11c, when a communication arrives it is marked in the E-mail Server 1114 as to indicate when it will be escalated allowing for an Agent 1150 to know which contacts are about to be escalated. The Agent 1150 is then notified by a visual indication on the desktop as to which contacts are about to be escalated and the date and time when the contacts will be escalated. This permits the Agents 1150 to manage workloads efficiently. When a communication that is being worked on becomes aged to the point where it is near the limit of missing the SLA, or perhaps when an escalated communication becomes aged further while an Agent 1150 is working on it, and for some reason is slow to complete a response, further action is taken to ensure the SLA is met. In both of these cases, the Contact Center 1100 monitors the age of all communications that are actively being worked on by Agents 1150, and after noticing it is in danger of not being completed in a timely manner, it presents a prompt to the Agent 1150 asking if the Agent 1150 is still working on the communication or whether the Agent 1150 is even presently working. If the Agent 1150 is present and the communication is being actively worked on, the Agent 1150 can indicate whether they wish to keep the communication or let it be escalated into an immediate workflow and be presented to another Agent 1150. If the Agent 1150 can complete the work, they may indicate that they want to keep the communication and continue to work on it. If the Agent 1150 can't complete it, they may indicate that it should be escalated to an immediate workflow for another Agent 1150 to handle. A timeout, i.e., if the Agent 1150 does not respond to the original prompt, will default, thereby escalating the communication to the immediate workflow and presenting the communication to another Agent 1150. This will keep communications that are in process with Agents 1150 who for some reason cease to actively work on them from failing to meet SLAs.

Figure 12:
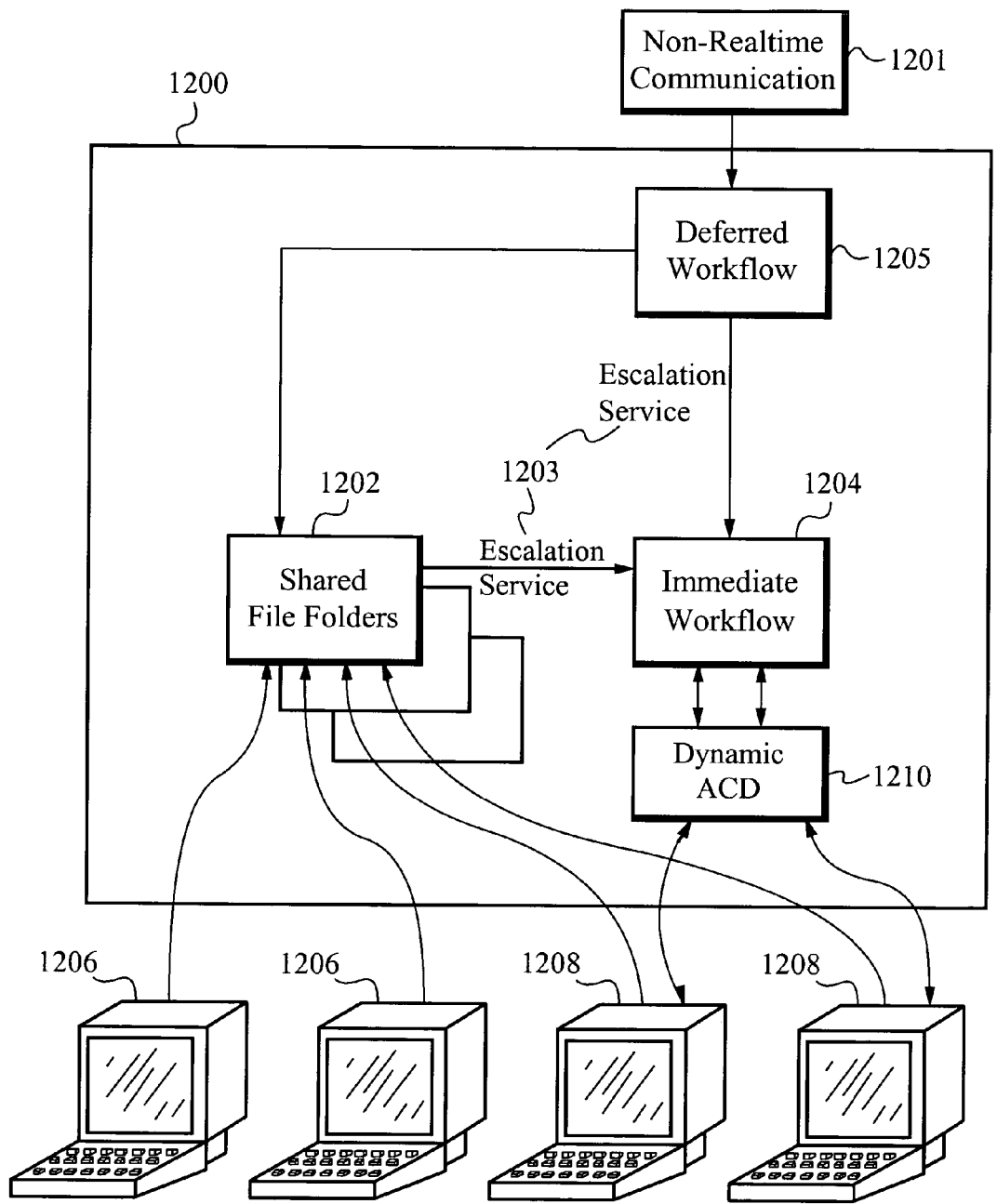
FIG. 12 illustrates a graphical representation of a Node architecture of the preferred embodiment of the present invention.

Referring now to FIG. 12, a Central Processing Area 1200 of the preferred embodiment of the present invention is depicted to show the operation of escalated communications in the Contact Center 1100 of FIGS. 11a-11c. It should be noted that FIG. 12 is that of a typical Central Processing Area (CPA) 1200 that has been simplified to illustrate only the Shared File Folders 1202, the Deferred Workflow 1205, the Immediate Workflow 1204, the Escalation Service 1203 and the Dynamic Automatic Contact Distributor (ACD) 1210 of the preferred embodiment of the present invention. It should be understood that the CPA 1200 of the preferred embodiment of the present invention may and usually will include additional features and components. Further, the CPA 1200 of the present invention can be any Hub (Hub-A, Hub-B) in the Contact Center 100 as described in the patent application entitled CONTACT CENTER ARCHITECTURE as incorporated by reference.

Still referring to FIG. 12, Non-Realtime Communications 1201 arrive in the CPA 1200 and enter a Deferred Workflow 1205. In the Deferred Workflow 1205, if the Non-Realtime Communications 1201 require immediate service, they are escalated to the Immediate Workflow 1204, where they will be routed to Designated Agents 1208 through the Dynamic ACD 1210. Such Non-Realtime Communications 1201 include such items as emails and voice messages from "Platinum" customers, etc. This will be discussed in greater detail below. The Non-Realtime Communications 1201 in the Deferred Workflow 1205 that are not required to have immediate service are placed in Shared File Folders 1202, where all Agents 1206, 1208 have access to them. There can be many Shared File Folders 1202 presorted with emails based on content of the "subject" field, "from" or "to" addresses, hidden "headers," etc. The Agents 1206, 1208 are able to access the Shared File Folders 1202 and answer communications of their choice or as assigned by the Dynamic ACD 1210. As discussed previously, this system allows for some of the communications to remain in the Shared File Folders 1202 until near their SLA limit, which in some cases could be several days. Because Agents 1206, 1208 tend to select communications that are better tailored to their expertise, interests or communications requiring a simple or short response, a number of the communications in the Shared File Folders 1202 are neglected and need to be answered when nearing their SLA limit. These communications then need to be escalated.

Also in FIG. 12, the escalation service as described above allows for a maximum number to be set as a ceiling to limit the number of immediate escalated workflows that may run simultaneously. This limit takes into account the large numbers of contacts that may threaten to flood the agents handling immediate contacts. In such situations an outgoing message may be sent to reset customer expectations for the delay in processing the original message. It thus enables a manageable solution for the system administration of the Contact Center 1100.

Still referring to FIG. 12, when a communication becomes an aged communication as defined by its proximity to missing its SLA, the aged communications are removed from the Shared File Folders 1202 and are delivered by the Escalation Service 1203 to the Immediate Workflow 1204. All data collected before the communication is escalated is retained and sent by the Escalation Service 1203 to the Immediate Workflow 1204. The Dynamic ACD 1210 routes the escalated communication to a Designated Agent 1208. Designated Agents 1208 are those Agents 1206, 1208 that are qualified and selected by the operator of the Contact Center 1100 (FIGS. 11a-11c) to respond to communications which become aged or, more generally, any communications with an Immediate Workflow 1204. Typically, the Designated Agents 1208 are those Agents 1206, 1208 that have more experience in handling all types of communications, perhaps have special skills such as additional languages or technical experiences or are specialized Agents 1206, 1208 that handle solely escalated communications from the Immediate Workflow 1204.

While either class of Agents (Designated or not Designated) 1206, 1208 are authorized to select and respond to communications from the Shared File Folders 1202, only the Designated Agents 1208 are available for receiving escalated communications from the Dynamic ACD 1210 as depicted in FIG. 12. In addition to routing the escalated communications to the Designated Agents 1208 after a communication becomes aged while waiting in the Shared File Folders 1202 or is escalated directly from the Deferred Workflow 1205, the Dynamic ACD 1210 is also able to reassign escalated communications that were previously assigned to Designated Agents 1208, but need to be reassigned when the Designated Agent 1208 is unavailable or unable to respond to the escalated communication.

In such a case as described above, the escalated communication is monitored after being routed to the Designated Agent 1208. After a predetermined time of inaction in responding to the escalated communication, the CPA 1200 will prompt the Designated Agent 1208 assigned to the escalated communication to determine whether the Designated Agent 1208 is still working. If the Designated Agent 1208 is not currently available, the Immediate Workflow 1204 will re-route the escalated communication to another Designated Agent 1208. Likewise, if the first Designated Agent 1208 is unable to effectively respond to the escalated communication or does not want to respond to it, the Immediate Workflow 1204 will also re-route the escalated communication to another Designated Agent 1208.

Figure 13:
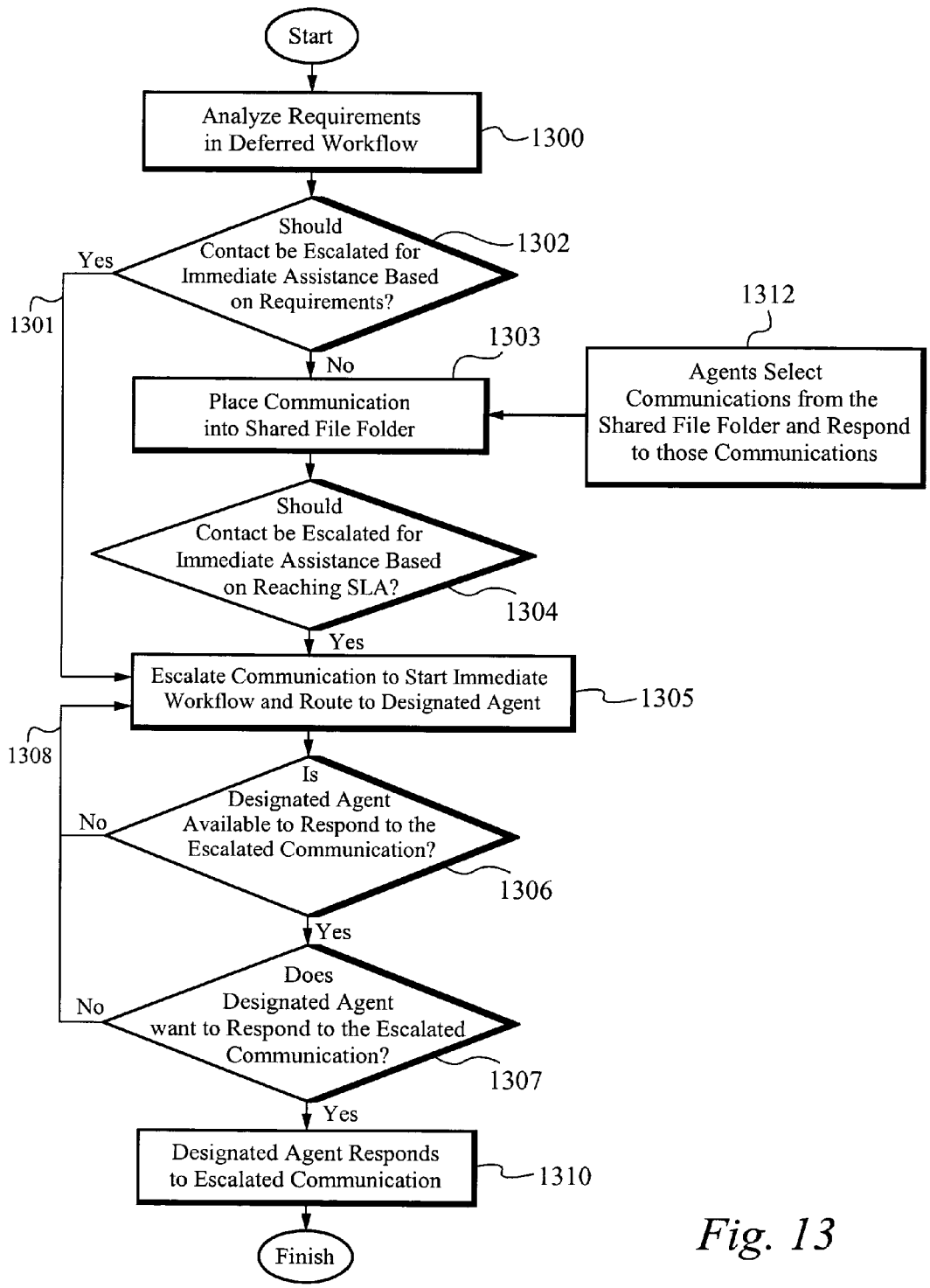
FIG. 13 illustrates a flow chart representation of the preferred embodiment of the present invention.

FIG. 13 is a flow chart depicting a preferred method of the present invention. Referring to FIG. 13, the method begins at step 1300 when communications enter the central processing area (CPA) and are placed in a deferred workflow. In step 1302, the deferred workflow determines whether the contact should be escalated for immediate assistance based on requests in the contact such as "Platinum" customer, etc. If the contact should not be escalated in step 1302, the contact is placed into a shared file folder in step 1303. Communications enter the shared file folders, which are configured in a CPA of the contact center of the present invention. In step 1304, after communications collect in the shared file folders in step 1303, it is determined whether any aged communications are in the shared file folders, i.e. whether any communications need immediate assistance based on reaching a SLA. If there is an aged communication in the shared file folders, the aged communication is escalated to start the immediate workflow in step 1305. This escalated communication is then routed to a designated agent as an immediate contact. Whether an agent is designated is predetermined by the operator of the contact center. Referring back to step 1302, if the deferred workflow determines that the communication should be escalated based on business requirements, then step 1301 escalates that communication in step 1305 directly to the immediate workflow for routing to a designated agent.

Still referring to FIG. 13, the escalated communication is monitored and it is determined in step 1306 whether the designated agent is available to respond to the escalated communication. If the designated agent is available, it is then determined in step 1307 whether the designated agent is able or even wants to respond to the high priority communication. If in either step 1306 or 1307, the designated agent is unavailable, unable or unwilling to respond to the escalated communication, then path 1308 returns the escalated communication to the immediate workflow in step 1305 for routing as an immediate contact to another designated agent. However, if the designated agent is able and willing to respond to the escalated communication, the designated agent will respond in step 1310, before the method is finished. Step 1312 displays how agents, designated as well as non-designated, select communications from the shared file folders and respond to them as they wish while the preferred escalation method occurs in the present invention depicted in FIG. 13.

The above detailed description describes a preferred embodiment of the present invention including a system and method of escalating non-realtime communications in a Contact Center 1100, preferably having a hub and node architecture as incorporated by reference. The detailed description contained in the remainder of this application describes alternative embodiments of the present invention including escalation and de-escalation of email in a three tier service model.

Three Tier Escalation Model

In the following detailed description of alternative embodiments of the invention, reference is made to the accompanying drawings in which like references indicate similar elements, and in which is shown by way of illustrations specific embodiments in which the invention may be practiced. These embodiments are described in sufficient detail to enable those skilled in the art to practice the invention, and it is to be understood that other embodiments may be utilized and the logical, mechanical, electrical, functional and other changes may be made without departing from the scope of the present invention. The following detailed description is, therefore, not to be taken in a limiting sense, and the scope of the present invention is defined only by the appended claims.

The detailed description of the alternative embodiment is divided into four sections and conclusion. In the first section, a system level overview of the invention is presented. In the second section, methods for an embodiment of the invention are described with reference to flowcharts. In the third section, a particular Internet Contact Center (ICC) implementing of the invention is described. In the final section, an operating environment in conjunction with which alternative embodiments of the invention may be practiced is presented.

System Level Overview

A system level overview of the operation of an alternative embodiment of the invention is described by reference to FIGS. 1 and 2.

Figure 1:
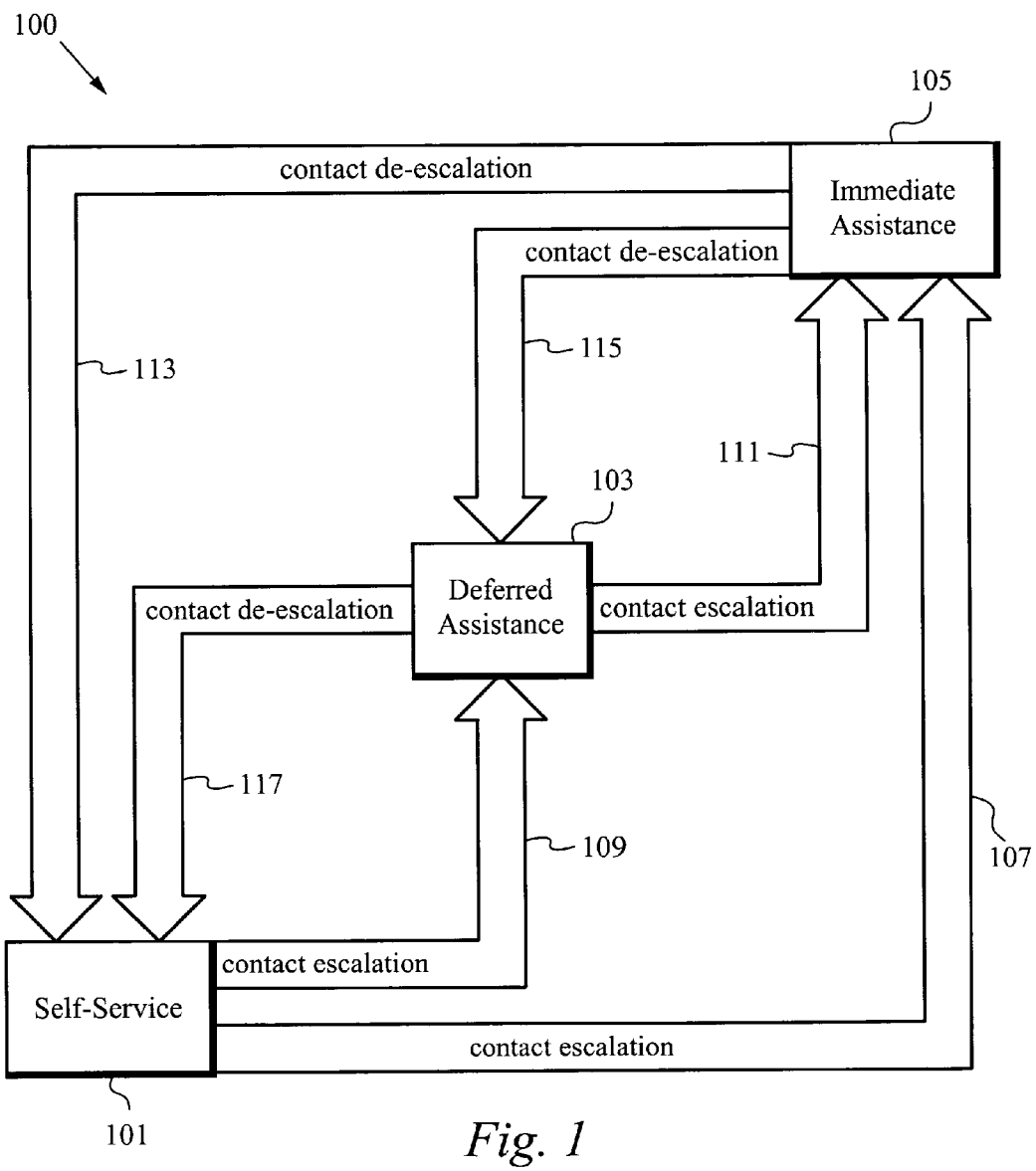
FIG. 1 is a diagram illustrating a three-tiered service model for a digital multimedia contact center of the present invention.

FIG. 1 illustrates a tree-tiered service model 100 for a digital multimedia contact center. As shown, there and three service tiers: self-service tier 101, deferred service tier 103, ans immediate assistance tier 105. Contacts accessing the center at the self-service trier 101 do not require the assistance of an agent at the contact center, while contacts being serviced at the deferred tier 103 and the intermediate assistance tier 105 do require agent activity. A contact accessing the center at deferred tier 103 is present to an agent pulls a deferred contact for processing when there are no immediate assistance contacts to process. A contact at the immediate assistance tier 105 is presented in a "push" model as a foreground task. One immediate assistance contact is pushed to the agent's desk at any one time and in such a way that it is obvious to the agent that this contact must be handled immediately. As a particular contact is presented, any related customer information is also shown. The components for the different tiers are designed to handle different magnitude fo contacts. The self-service tier components will process orders of magnitude more contacts than the deferred tier components, which will process orders of magnitude more contacts than the immediate assistance tier components.

A contact entering the contact center is initially assigned to one of the three tiers based on the type of media used by the contact in accessing the contact center. The embodiment shown in FIG. 1 is further described with reference to three media types: voice calls, emails and World Wide Web, although the invention is not so limited. Voice calls are initially routed to the immediate assistance tier 105, emails are initially routed to the deferred tier 103, and Web contacts are initially routed to the self-service tier 101.

The subsequent routing may be preformed that escalates or de-escalates the contact to another tier (shown as arrows in FIG. 1). the subsequent routing can be based on one or more routing criteria, including factors defined by the contact center owner or subscriber, such as priority, access phone numbers, and time-out periods, and environmental factors such as contact activity. The routing criteria associated with a contact may change as the various components in the contact center process the contact. For example, if the routing criteria of a contact passes a pre-defined threshold, the contact may be escalated or de-escalated. Thus, an email is escalated (arrow 111) to the immediate assistance for 103 if it has not been answered when a "time-to-reply" period elapses. A voice call is initially routed to the immediate assistance tier 103 but is de-escalated (arrow 115) to the deferred tier 103 if the caller chooses to leave a voice-mail, or de-escalate (arrow 113) to the self service tier 103 if the contact is sent to an interactive voice response (IVR) system for more processing. A self service WEB contact can be escalated (arrow 107) into the immediate assistance tier 103 by through "Click and Talk" buttons available on the WEB site, or escalated (arrow 109) to the deferred tier 103 if the contact chooses to send an email instead. Details of the escalation and de-escalation of each media type is described in more detail in conjunction with the flowcharts in the next section. Furthermore, although the exemplary embodiments focus on voice, email, and WEB contacts for ease in understanding, it will be appreciated that the invention encompasses all potential analog and digital media types, including fax, "faxback", video, etc. In the addition to being extensible to other WANs and to LANs. It will also be appreciated that the contact is not limited by its initial media type so, for example, the contact and agent in a collaboration session could be also talking by phone, an email message could generate a return fax or phone call, or the expiration of a time-out on a collaboration request generate an email message to the contact promising a response within a set time period.

Figure 2:
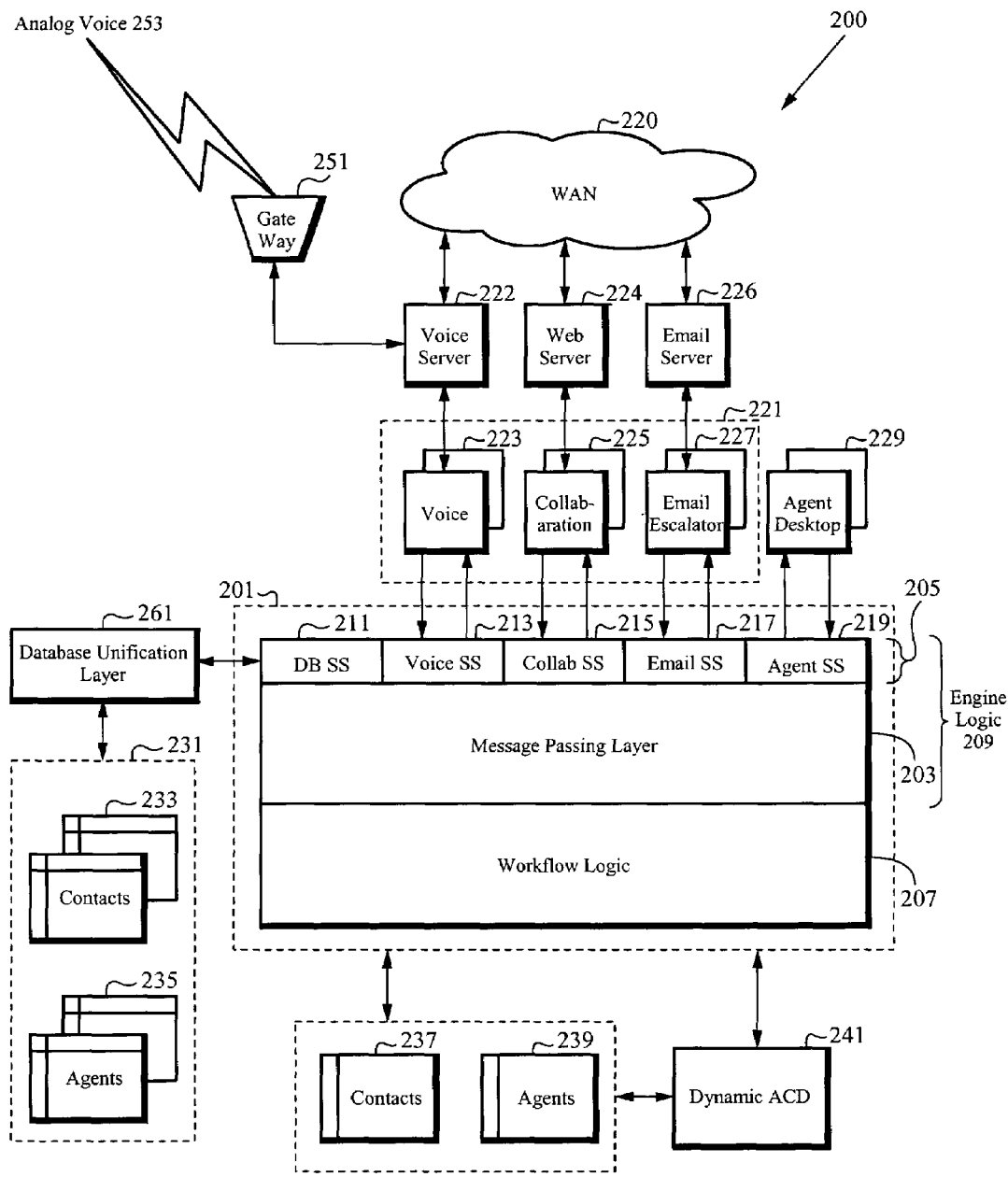
FIG. 2 is a diagram illustrating an embodiment of a system architecture underlying the digital multimedia contact center model shown in FIG. 1.

The alternative embodiment three-tier service model 100 illustrated in FIG. 1 operates within a digital multimedia contact system, one embodiment of which is shown in FIG. 2. The system architecture for contact center 200 is based on a workflow engine 201 that directs the activities of the agents in the center using workflow steps. A contact workflow is initiated by events that are routed into one of a set of workflow subsystems 205 dedicated to a contact media type. An agent workflow is initiated by events routed into an agent subsystem 219 by an agent desktop component 229. Events that trigger a workflow include a new call arriving at the contact center or an agent logging in. The workflow for a contact remains active until the contact is terminated; the workflow for an agent remains active until the agent logs out of the contact center 200.

The workflows are executed by workflow logic 207. Events are passed between the workflow logic 207 and the workflow subsystems 205 by a message passing layer 203. The events can also modify the execution flow of existing contact or agent workflows.

When executed by the workflow logic 207, a workflow for an immediate assistance contact causes a dynamic ACD (automatic contact distributor) 241 to allocate an agent to the contact. The allocation is also reflected in the agents workflow. The operation of the dynamic ACD 241 is descried in further detail below.

A contact coming into the contact center 200 of this alternative embodiment is initially classified in accordance with a set of previously defined classifications, e.g., Sales, Customer Service, Support, etc., by the appropriate workflow subsystem 205. Additional information is also gathered to determine the optimal routing of the contact. Information that narrows down the set of agents to which a contact can be routed is referred to as "contact requirements". Examples of contact requirements include product knowledge, language fluency, and previous communication with the contact (each contact is considered a new one). Origin and destination information now is consistently collected from all media types, such as calling phone number and called phone number for voice calls. Subject information may also be collected from voice contacts based on responses to IVR menu options.

A voice router 223 provides an interface between a voice subsystem 213 and a conventional digital telephony system (voice server 222), that handles IP (Internet Protocol) calls. The voice subsystem 213 starts a workflow when a call arrives at the contact center 200 and communicates a request to the voice server 222 to redirect the call to an agent (or to voice mail or IVR) as determined by the workflow. The voice server 222 receives digital voice calls (referred to as voice-over IP or IVR) directly from a digital wide-area network (WAN) 220, such as the Internet, or via a gateway 251, that converts analog voice calls 253 to VoIP calls. The gateway 251 also converts VoIP calls from the digital telephony system 222 into analog voice originals for transmission back to the caller.

A conventional email system (email server 226), processes deferred contacts received from the WAN 220. The email system uses its own in-line rules engine for processing incoming email and placing it into mailboxes to be accessed by the agents as backgrounds tasks. The agents retrieve deferred contacts from these mailboxes explicitly. An email escalator 227 provides an interface between an email system 217 and the conventional email system for emails that are escalated from deferred to immediate assistance. The email escalator 227 periodically reviews the mailboxes for pending emails that meet pre-determined criteria for escalation, such as time-to-reply or customer value parameters. It then collects information about the email (customer, priority etc.) And passes this to the email subsystem 217. In one embodiment, the emails are evaluated in chronological order and the emails that meet the escalation criteria are further broken down by classification and within a particular classification, the email is passed to the email subsystem 217 on a first-in first-out basis.

The email subsystem 217 determines if the contact is entitled to be escalated to an immediate assistance contact based on the contact information and starts a contact workflow if it is. When the workflow succeeds in routing the email to an agent, the agent address is returned to the email escalator 227, which passes it to the email subsystem 217 for actual routing to the agent. In an embodiment in which voice mail is routed to an agent as an audio attachment to an email, the email escalator 227 also serves to escalate voice mails to the immediate assistance tier if appropriate.

A conventional Web server 224 processes self-service contacts that originates from the WAN 220. Such a server can offer browsing and searching capabilities for a knowledge base, or a set of FAQs (frequently asked questions). A collaboration router 225 provides an interface between a collaboration subsystem 215 and a conventional collaboration system, that executes on, or in conjunction with, the Web server 224. Web pages on the Web server 224 are modified to include "Click to Chat/Talk" buttons to connect to the collaboration system. When the button is clicked by a Web contact, the collaboration systems sends an event to the collaboration router 225, which in turns sends an event to the collaboration subsystem 215. The collaboration subsystem 215 determines if the contact is entitled to be escalated to an immediate assistance contact and initiates a contact workflow if so. Once the collaboration request has been assigned to an agent, the agent address is passed back to the collaboration router 225 for actual routing. Other agents may be included in the collaboration session if necessary.

An agent subsystem 219 provides an interface between one or more agent desktops 229 and the workflow logic 207 for agent events. When notified of an agent login by the corresponding agent desktop 229, the agent subsystem 219 validates the agent before starting an agent workflow that describe the agent's work process until the agent logs out. The agent desktop 229 notifies the agent subsystem 219 of all agent state changes. The agent subsystem 219 is also responsible for watching the agent's phones for outbound call events. It passes this information to the workflow logic 207 to ensure the agent state is changed to "busy". In addition, when an agent initiates a call, the agent subsystem 218 sends an "outbound call" event to the agent's workflow so the agent initiated contacts can be tracked.

The agent desktop 229 controls the presentation of tasks on an agent's desktop. The tasks originate from the multiple conventional systems with which the contact center 200 interfaces as previously described, as well as from the workflow engine 201. Each of the conventional systems has its own user interface. Monitoring tools may also be available to certain agents, such as those providing statistics on the operation of the contact center and individual agents. The agent desktop 229 integrates the separate user interfaces into a single coherent interface that presents the agent with immediate assistance contacts as foreground tasks and deferred contacts as background tasks. Thus, for example, the foreground mode integrates the telephony interface, the collaboration interface. And the email interface (for escalated emails). Similarly, the background mode integrates the email interface (for non-escalated emails and other deferred contacts, such as voice mail, fax, forms, etc.) And the monitoring tools, for example. The agent desktop 229 also integrates with any existing customer relation management applications to provide customer information to the agent for the foreground and background tasks. The connection between the agent desktops 229 and the conventional systems 222, 224, 226 are not shown in FIG. 2 for clarity in illustration.

In the alternate embodiment shown, the agent desktops 229 do not communicate directly to the agent subsystem 219 but are managed through a desktop manager component that handles concurrent requests from desktops and routes responses. To concurrently handle multiple desktops, the desktop manager component communicates with a server portion that queues events arriving from the agent subsystem 219 and sends them to the appropriate desktop in response to polls from the desktops. Executing the server portion of the desktop manager on a machine separate from that executing the agent subsystem provided additional scaling capabilities to the contact center.

The relationship among the components of the contact center 200 described so far is most easily understood through an example. When an analog voice call 253 is received by the gateway 251, it is converted to a VoIP call and directed by the voice server 222 to a voice media router 223. The voice media router 223 informs the voice subsystem 213 of the incoming contact and the voice subsystem 213 creates a workflow for the contact. Assuming the contact is to remain at the immediate assistance tier 103, the workflow requests the dynamic ACD 241 allocate an agent to the contact. The dynamic ACD 241 passes the agent information back to the voice router subsystem 213, which then sends the agent and contact information to the voice router 2243. The voice router 223, in turn, sends the information to the voice server 222 for routing. The voice server 222 transfers the contact to the appropriate agent desktop 229 as a foreground task.

Returning now to FIG. 2, the workflow engine 201 also contains a database 231 of contact 233 and agent records 235. A database unification layer 261 confines the information in the database 231 and information maintained by the voice 222, Web 224, and email 226 servers into a coherent view of the contact center. The contact and agent workflows query and update the database 231 through a database subsystem 211 that converts workflow requests into calls for the database unification layer 261. In an alternate embodiment not shown in FIG. 2, the contact and agent workflows query the database unification layer 261 directly. In yet another alternate embodiment, the database unification layer is incorporated into the database subsystem 211.

The database unification layer 261 has access to, and accessible by, all the other components of the contact center to allow reporting and analysis of the activities of the contact center regardless of the media type used by the contacts. The connections between the database unification layer 261 and the other components are not shown in FIG. 2 for clarity in illustration. The information can be retrieved through the database unification layer 261 by a monitoring tool (*not shown) to graphically and/or numerically illustrate the state of the contact center (number of contacts awaiting service, how many agents are on break, etc.). For instance, the monitoring tool may display the number of un-serviced contacts broken down by classification. Additionally, a conventional reporting application can be employed to obtain information through the database unification layer 261 for standardized reports. Agents, supervisors and managers may each have access to a set of such reports to gauge the efficiency of the contact cen5tr, a group, or individual agent.

The database unification layer 261 also provides for the collection of billing information and for the tracking of contacts through the contact center, both across media types.

In the alternative embodiment shown in FIG. 2 the dynamic ACD 241 uses unordered lists of waiting contacts 237 and available agents 239 to match a contact with an agent. The workflow engine 201 causes the dynamic ACD 241 to create and manage the unordered lists of contacts 237 and and agents 239. Although shown as separate from the database 231 in FIG. 2 it will be appreciated that the unordered lists 237, 239 may be database structures that are managed by the database subsystem 211 as instructed by the workflow engine 201 and the dynamic ACD 241.

As previously described, contact requirements (e.g., product knowledge, language fluency, previous communication) are used to determine the set of agents to which a contact can be routed. Information used to decided the appropriateness of an agent within the set is referred to as "agent attributes" and may include such parameters as seniority and length of time waiting for a contact. Furthermore, agents may be dedicated to one or more contact classifications. When an immediate assistance contact requests an agent, the dynamic ACD 241 searches for an appropriate agent from list 239 of available agents by filtering the agents against the contact classification and any requirements, and prioritizes the resulting agents according to their attributes. If an agent is available, the dynamic ACD 241 passes the information for the agent back to the appropriate subsystem to route the contact to the agent and removes the agent from the available agent list 239. If no appropriate agent is available, the contact is entered into the waiting contact list 237 until an appropriate agent becomes available to take the contact. Similarly, when an agent requests a contact, the waiting contact list 237 is filtered by classification and "agent requirements" (e.g., media type, territory) and prioritized according to contact attributes such as time in queue and business value. The matching process is invoked by a step in the contact workflow for an immediate assistance contact or in the agent workflow for an available agent as explained further below.

As illustrated in FIG. 2 there may be multiple instances of each of the media routers 221. There is also an instance of the agent desktop 229 running on each agent workstation in the contact center. Although only a single set of workflow subsystem 205 is shown, it will be appreciated that workflow engine 201 may obtain multiple instances of one or more of the workflow subsystem 205 depending on workload. Additionally, multiple workflow engines 201 may be present within a contact center 200.

Furthermore, the architecture permits distribution of the various components among multiple computers, thus enabling scalability of the contact center 200. As described previously, each component provides services for other components. For instance, the dynamic ACD 241 provides an agent allocation service and the collaboration subsystem 215 provides a collaboration workflow service. In one embodiment, a service manager (not shown) provides a central location for registration and discovery of the contact center service providers. When a component needs a service (such as the initialization of a workflow), it calls the service manager to find the location of that service. The service manager reviews a list of all registered providers of that service and selects the appropriate providers (e.g., shortest routing to requester). Finally it chooses the best provider based on the unused capacity of each service. Thus, the contact center 200 may continue to start service on new or existing machine as necessary to deal with its workload.

The system level overview of the operation of the alternative embodiment of the invention has been described in this section of the detailed description. A tiered service model that allows the escalation and de-escalation of a contact has been described, along with its operation within a digital multimedia contact center. The digital multimedia contact center handles contacts in accordance with the contact's required level of service instead of relying solely on the media type to determine the necessary processing. Because different levels of service incur different quantities of contacts, different processing methodologies are appropriate within the contact center. Thus, workflows are used to handle immediate assistance contacts regardless of media type because of workflow engine excels at processing relatively small numbers of contacts in real-time. A workflow engine also gives the subscriber fine-grained control over the handling of the high priority contacts that require immediate assistance. On the other hand, deferred contacts number least an order of magnitude greater than immediate assistant contacts and are handled most efficiently through an inline rule engine such as commonly implemented in an email (and/or voice mail). Finally, because the greatest number of contacts are self-service contacts which require no agent interventions, processing techniques such as interactive voice response, automatic email response, and knowledge base/FAQ logic on Web servers are used.

While the alternative embodiment of the present invention is not limited to any particular number of service tiers, this embodiment has been described in terms of a three tier model. The invention has further been described using An example that mixes voice calls, emails, and Web contacts within the same contact center but the invention is not so limited. Additionally, the invention can be practiced with any underlying architecture that allows the escalation and de-escalation of contacts through a tiered service model.

Methods of Embodiment of the Invention

In the previous section, a system level overview of the operation of embodiments of the invention was described. In this section, the particular methods of one alternative embodiment of the multimedia copy contact center 200 are described in terms of computer software with reference with a series of flowcharts and also a series of tier diagrams. The flowcharts and tier diagrams are grouped according to related components within the contact center. Thus, FIG. 3A and flowcharts FIGS. 4A-C illustrate the processing of the voice components. FIG. 3B and flowcharts 5A-C illustrate the processing of the email escalator components. FIG. 3C and flowcharts 6A-C illustrate the processing of the collaboration components. The processing of the agent components are illustrated only through flowcharts in FIGS. 7A-C.

The methods to be performed by a computer constitute computer programs made up of computer-executable instructions. Describing the methods by reference to a flowchart enables one skilled in the art to develop such programs including such instructions to carry out the methods suitably figured computers (the processor of the computer executing the instructions from computer-readable media) acting as one or more of the components of the contact center 200 in FIG. 2. The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to apeak of software, in one form or another (e.g., programs, procedure, process, application, module, logic . . . ), as taking an action or causing a result. Such expressions are merely a shorthand way of saying that execution of the software by a computer causes the processor of the computer to perform an action pr a produce a result.

Figure 3A:
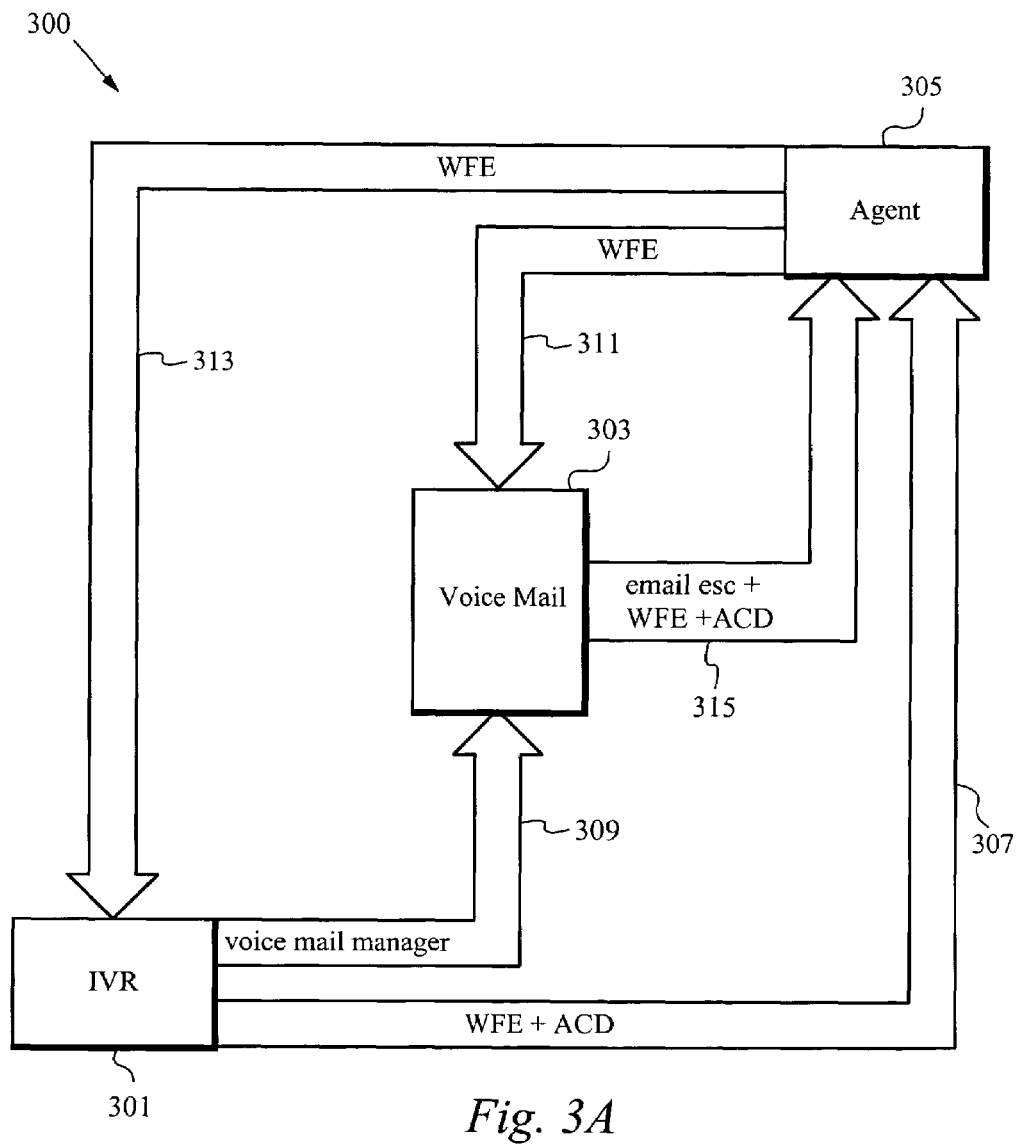
FIGS. 3a-3c are diagrams illustrating the processing of media-specific contacts within the architecture of the digital multimedia contact center shown in FIG. 2.
Figure 3B:
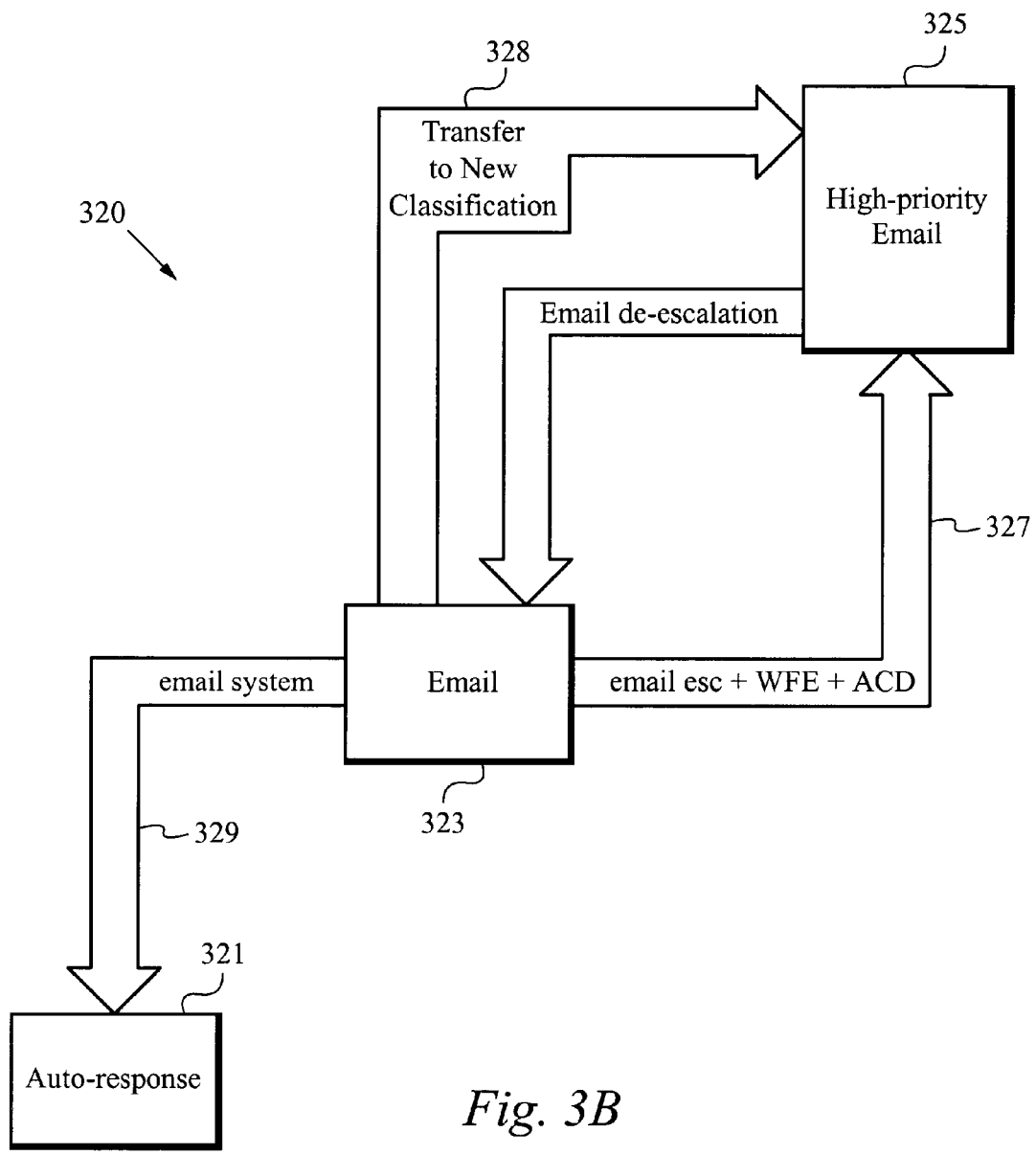
Figure 3C:
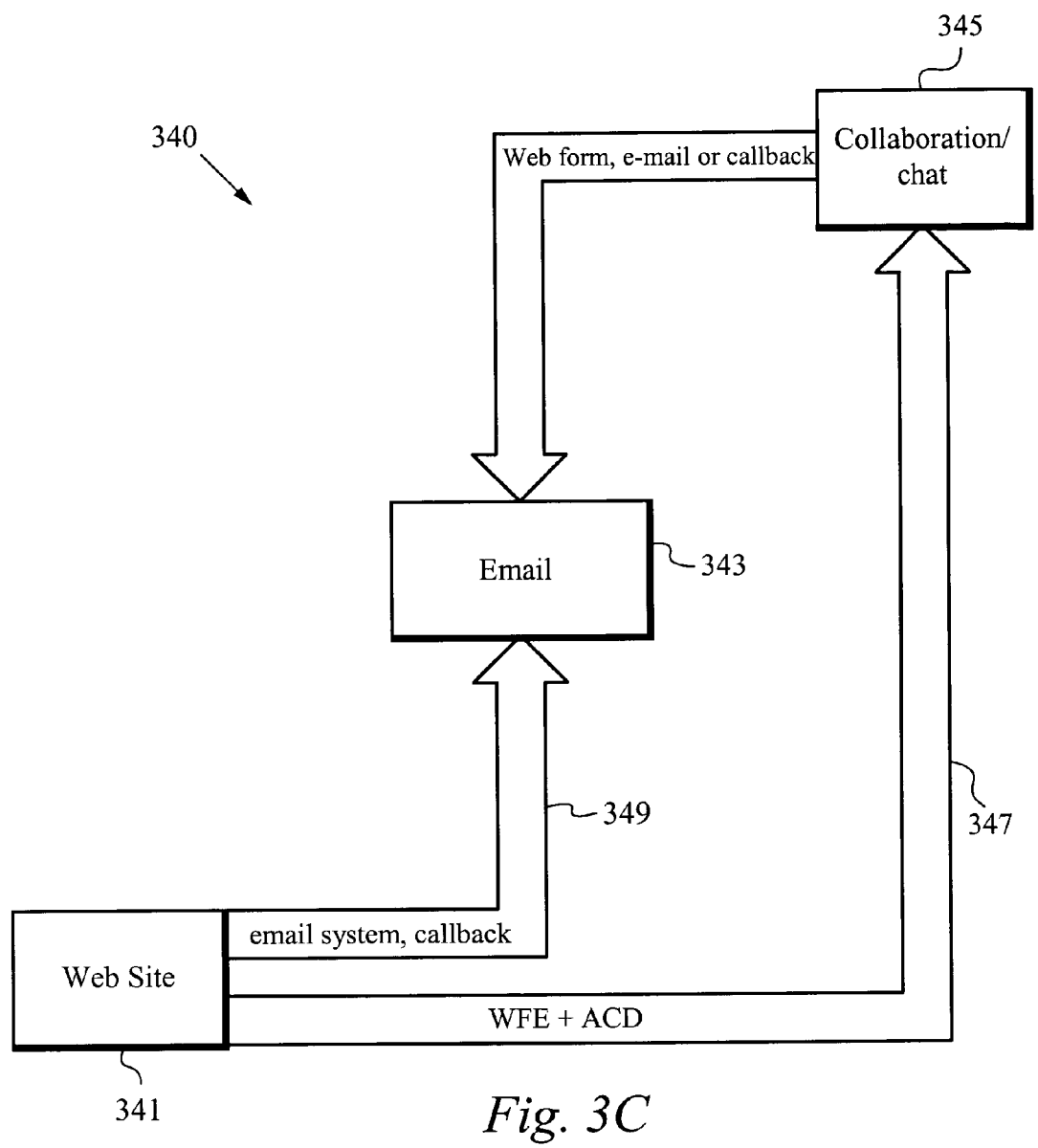
Figures 4A, 4B:
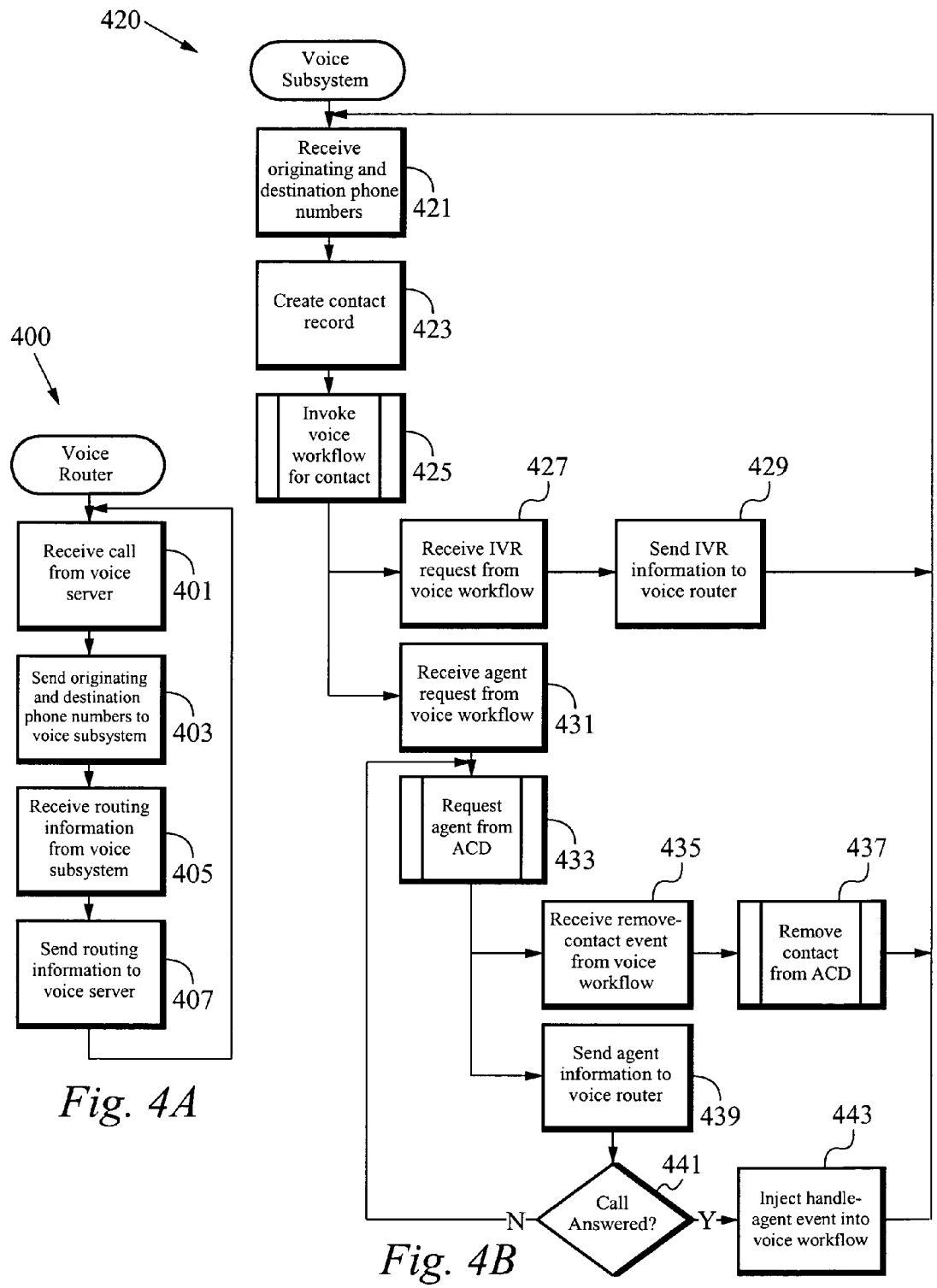
FIGS. 4a-4c are flowcharts of method s to be performed by voice components in the embodiment of the digital multimedia contact center shown in FIG. 2.
Figure 4C:
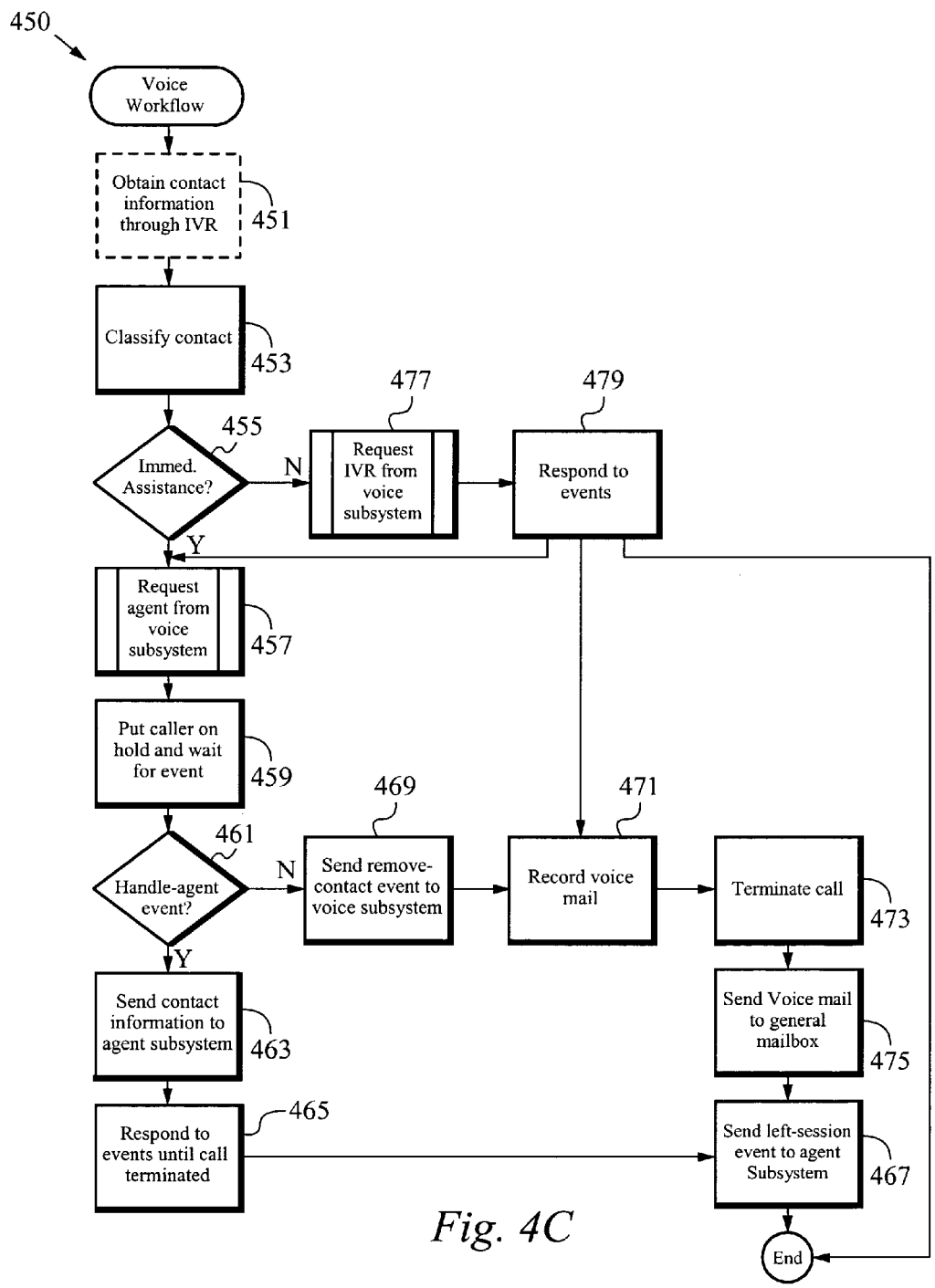

As shown in FIG. 3A, the voice components receive a voice phone call and direct it to either an agent for immediate assistance 305 or to an interactive voice response system 301 for self-service. If directed initially to an agent 305, the workflow engine may de-escalate the contact (represented by arrow 311) voice mail 303 if an agent is not available within a given period of time. In addition, the workflow engine may de-escalate an immediate assistance contact (represent by arrow 311) to interactive voice response (IVR) 301 if the call priority is less than a pre-determined amount or if the caller chooses self-service. A self-service contact may be escalated by a voice mail manager (represented by arrow 309) if the user chooses to leave voice mail.

Alternatively, when a self-service contact requests active assistance from an agent, the workflow engine 201 and the dynamic ACD 241 escalate the contact into the immediate assistance 305 as presented by arrow 307. In an embodiment in which the voice mail recording is attached to an email for subsequent processing by an agent, the email with the voice mail attachment may be escalate through a combination of the email escalator, the workflow engine, and the dynamic ACD (represented by arrow 315) as explained below in conjunction with FIGS. 3B and 5A-C.

Turning now to FIGS. 4A-C, the flowchart in FIG. 4A illustrates the acts performed by the voice router 223 component when executing a voice router method 400. The voice router method 400 receives notification of a call from the voice server 222 (block 401). As part of the information received from the gateway, the voice router method 400 receives the originating and destination phone numbers for the call, which it then sends to the voice subsystem 213 (block 403). The voice subsystem determines how to route the call, as will be described further below, and sends the routing information to the voice router. The voice router method 400 receives the routing information (block 405) and then sends the routing information to the voice server 222 for routing (block 407).

Turning no to FIG. 4B, a voice subsystem method 420 executed by the voice subsystem component 213 is described. The voice subsystem method 420 receives the originating and destination phone numbers from the voice router (block 421), collects additional contact information and creates a contact record for the contact (block 423). The voice subsystem method 420 then evokes an appropriate voice workflow for the contact from the workflow engine 201 (block 425). One of the steps within the voice workflow will be the determination of service tier, i.e., immediate assistance ir a self-service. Assuming the contact is a self-service contact, the voice subsystem method 420 receives an IVR request from the voice workflow at block 427 and then sends the IVR information to the voice recorder at block 429 so that the voice router will route the voice call to interactive voice response. On the other hand, if the workflow determines that the contact is an immediate assistance contact (block 431), the voice subsystem method 420 receives an agent request from the workflow and requests an agent from the dynamic ACD (block 433) in response. The dynamic ACD attempts to match an agent with the contact as previously described. Assuming no agent is available within a pre-determined period of time, the workflow causes additional options to be presented to the contact. In one instance, the contact may choose to be routed to voice mail, at which point the workflow engine sends a remove-contact event to the subsystem method 420, which is received at block 435. In response, the voice subsystem method 420 requests that the contact be removed from the list by the dynamic ACD (437). If, however, an agent is available, the dynamic ACD sends the agent information to the voice subsystem method 420, which in turn sends the agent information to the voice router (block 439) so that the voice router may appropriately route the contact to the chosen agent. The voice subsystem method 420 continues to monitor the contact to determine if the call is answered within a reasonable period of time (block 441). If it is, then the voice subsystem method 420 injects a handle-agent event into voice workflow at block 443 so that the workflow will continue to handle the contact as explained further below. Alternatively, if the call is not answered, the voice subsystem method 420 returns to block 433 and requests another agent from the dynamic ACD. In one embodiment, the voice subsystem method 420 generates events which create and update contact information regarding the voice call in the database 231.

FIG. 4C illustrates an alternative embodiment of a voice workflow 450 that is executed by the workflow logic 207 for a voice contact. When the voice workflow 450 is initiated, it obtains contact information through the IVR process at block 451 (shown in phantom) if it is unable to determine the contact information at block 453. A determination is made as to the level of service to be given to this contact (block 455). If the contact is not entitled to immediate assistance, the voice workflow 450 requests the contact be routed to the IVR system by the voice subsystem (block 477). The voice workflow 450 continues to monitor the contact because a contact at the IVR self-service tier 301 may choose to leave a voice mail or wait for an agent during the IVR sessions by inputting certain digits. The input digits are captured as events by the voice workflow 450 at block 479 and, depending on the event, the voice workflow 450 escalates the contact to the deferred assistance tier 303 by transferring the contact into the voice mail system (block 471) or to the immediate assistance tier 305 by requesting an agent for the contact (block 457). In one embodiment, the email system manager serves as the voice mail manager and the processing represented by block 471 is performed by the workflow. The workflow records the contact message, attaches the recording to an email message addressed to general mailbox, and sends the email to the email subsystem 217 for transmission to the email server 226.

If the contact is entitled to immediate assistance, an agent is requested from the voice subsystem at block 457 and the caller is put on hold to wait for events from the voice subsystem (block 459). If a handle-agent event is injected into the voices workflow 450 by the subsystem because an agent allocated to this contact has answered the phone, the handle-agent event is detected at block 471 and contact information is sent to the voice subsystem (block 463). The voice workflow 450 loops waiting for events and responding appropriately to those events, including updating the contact record, until the call is terminated as represented by block 465. Once the call is terminated, the voice workflow 450 sends a left-session event to the agent subsystem at block 467 that causes the agent to become available to receive a new contact.

If the contact chooses to be sent to voice mail prior to being routed to an agent (block 461), the voice workflow 450 sends a remove-contact event to the voice subsystem at block 469 to remove the contact from the list managed by the dynamic ACD. The voice workflow 4501 transfers the contact to the voice mail manager to record the message (block 471) and terminates the call after the message is recorded (block 473). The voice mail is then sent to a general mailbox to be acted upon by an agent at a later point (block 475). In one embodiment, the voice message is attached to an email message and place into the mailbox by the email system.

Referring now to FIG. 3B and FIGS. 5A-C, the email escalator component of the multimedia contact center 200 is described. As shown in FIG. 3B, a deferred email 323 is escalated into high priority email 325 through a combination of the email escalator, the workflow engine, and the dynamic ACD (represented as arrow 327). Alternatively, an email message may be handled through an automatic response option in the conventional email system ans such an email is de-escalated by the email server 226 (represented as arrow 329) into an auto response contact 321 or transferred to a new classification as represented as arrow 328. As automatic response options are common in conventional email systems, the de-escalated process is not further described.

FIG. 5A illustrates an email escalator method 500 performed by the email escalator 227. The email escalator method 500 constantly reviews the email system mailboxes or queues (block 501) to determine if any pending emails should be escalated based on factors previously described. If an email is to be escalated (block 503), it is placed in a high priority queue (block 505) and the email information is sent to the email subsystem 217 at block 507. As will be explained in conjunction with FIG. 5B, the email subsystem 217 matches the contact to the agent and returns the agent identifier, which is received by the email escalator method 500 at block 509. The email escalator method 500 routes the email (via the email system) to the agent desktop (block 511) as a foreground task. In one embodiment, the email is presented on the desktop already opened. Once the agent has determined that he or she is ready to handle the email, the email escalator method 500 receives an agent-ready event from the agent desktop (block 513) and sends that event to the email subsystem at block 515. The agent workflow will not assign the agent to any other contacts until the email is handled. In another embodiment, the email escalator method 500 instructs the email subsystem to identify an email that is close to being escalated and to give the agent visual clue, such as color or special icon, that the email must be handled immediately.

A component acing as the email subsystem 217 executes a email subsystem method 520 to perform the functions illustrated in FIG. 5D. The email subsystem method 520 receives the email information from the email escalator at block 521 and invokes the workflow logic 207 at block 523. In one embodiment, when the email subsystem method 520 receives the email information at block 523, it creates the contact record for the email and marks it as escalated. In an alternative embodiment, the email manager creates a contact record for each email received at the contact center and the email subsystem method 520 marks the existing contact record as escalated at block 523. The email subsystem method 520 requests the agent from the dynamic ACD at block 527.

When an agent is allocated to the contact, the agent identifier is returned from the dynamic ACD to the email subsystem method 520, which, in turn, at block 529 returns the agent identifier to the email escalator to cause the contact to be routed to be identified agent. The email subsystem method 520 injects a handle-agent event into the email workflow at block 531 in response to receiving the agent-ready event from email escalator. In one embodiment, the email subsystem method 520 generates events which create and update contact information regarding the escalated email in the database 231.

A method 540 for a contact workflow for an escalated email is illustrated in FIG. 5C. When the escalated email workflow 540 begins, it requests an agent from the email system at block 541, which causes the events previously described to occur. When the escalated email workflow 540 receives the handle-agent event at block 543, the workflow sends the email to the agent desktop at block 545 via the agent subsystem 219. As the agent is working with the escalated email message, the agent may generate events that cause the escalated email workflow 540 to perform certain functions, including updating the contact record, presented generally at block 547. When the agent is finished with the escalated email, the escalated workflow 540 sends a left-session event to the agent subsystem at block 549.

FIG. 3C illustrates the escalation that is performed for a contact that initially appears at the contact center 200 through a self-service Web site 341. By choosing to send an email or callback, the contact can be escalated (represented by arrow 349) through the email manager into a deferred email contact 343. Alternatively, if the contact clicks on a collaboration/chat button, it is escalated by a combination of the workflow engine and the dynamic ACD (represented by arrow 347) into an immediate assistance contact 345. As the sending of emails is handled by the conventional email system, the escalation from a self-service contact 341 into a deferred email contact 343 is not further discussed.

Figure 6A:
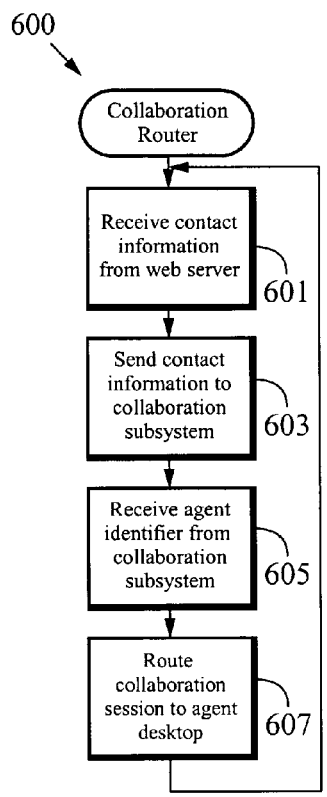
FIGS. 6a-6c are flowcharts of methods to be performed by collaboration components in the embodiment of the digital multimedia contact center shown in FIG. 2.
Figure 6B:
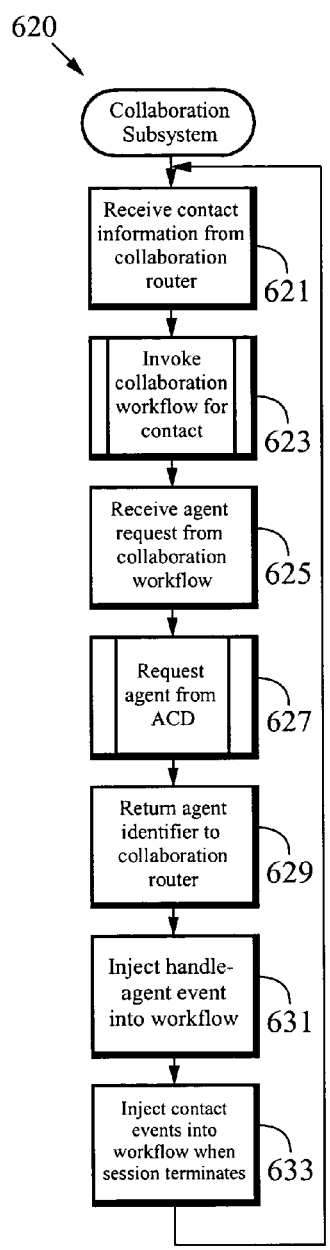
Figure 6C:
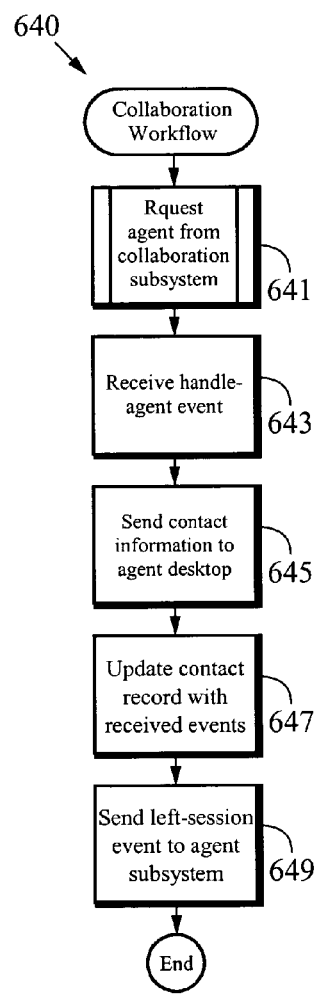

Turning now to FIGS. 6A-C, the escalation of a contact from self-service Web contact 341 to an immediate assistance collaboration contact 345 is described beginning with collaboration router method 600 performed by the collaboration router 325. The collaboration router method 600 receives the contact information from the Web server (block 601) and sends the contact information to the collaboration subsystem 215 (block 603) to have an agent allocated to the contact. When the collaboration router method 600 receives the agent identifier from the collaboration subsystem at block 605, it then routes the collaboration session to the contact desktop for the identified agent (block 607) via the collaboration server.

A collaboration subsystem method 620 executed by the collaboration subsystem 215 is next described in conjunction with FIG. 6D. The collaboration subsystem method 620 receives the contact information from the collaboration router at block 621 an invokes a collaboration workflow for the contact at block 623. The collaboration subsystem method 620 receives an agent from the dynamic ACD (block 629) for routing the collaboration session to the appropriate agent's desktop. The collaboration subsystem method 620 also injects a handle-agent event into the collaboration workflow at block 623. Events resulting from the collaboration session are injected into the workflow by the collaboration subsystem method 620 when the session terminates (block 633). In one embodiment, the collaboration subsystem method 620 generates events which create and update contact information regarding the collaboration session in the database 231.

Turning now to FIG. 6C, a collaboration workflow method 640 that is executed by the workflow logic 208 as a collaboration workflow for a contact is described. When the collaborations workflow method 640 begins, it requests an agent from the collaboration subsystem at block 641. The collaboration workflow method 640 receives a handle-agent event from the collaboration subsystem at block 643. The handle-agent event informs the workflow that the agent is now ready for the collaboration session and collaboration workflow method 640 sends the contact information to the agent desktop (block 645) via the agent 219 system. The collaboration workflow method 640 updates the contact record with the events received from the collaboration subsystem when the session is terminated (block 647). The collaboration workflow method 640 also sends a left-session event into the agent subsystem at block 649.

Figure 7A:
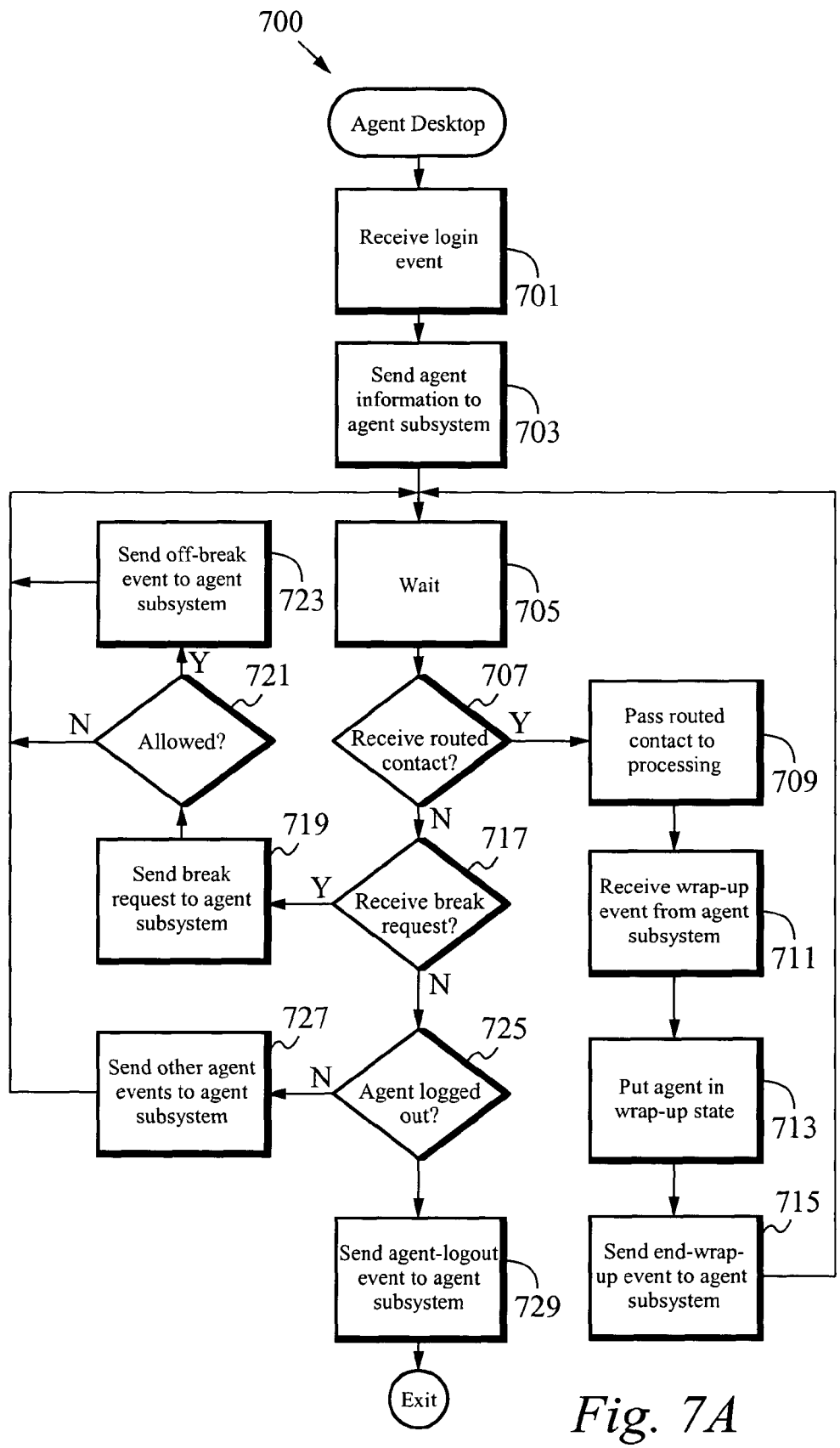
FIGS. 7a-7c are flowcharts of methods to be performed by agent components in the embodiment of the digital multimedia contact center shown in FIG. 2.

The methods used by the multimedia contact center 200 for agents are now described with reference to the flowcharts in FIGS. 7A-C. FIG. 7A illustrates an agent desktop method 700 that presents tasks on an agent desktop 229. The agent desktop method 700 receives a login event when an agent logs into the agent subsystem 219 at block 703. As part of their processing, the agent subsystem 219 and the agent workflow 207 make the agent available for contacts. The agent desktop method 700 waits for messages from the agent and the agent subsystem at block 705. If the agent desktop method 700 receives the routed contacts (block 707), it passes the contact information onto the appropriate underlying system (such as the email system and the collaboration system) at block 709. When the appropriate system has terminated the contact, the agent desktop method 700 receives a wrap-up event from the agent subsystem (block 711), which causes it to put the agent into a wrap-up state (block 713). The agent desktop method 700 sends an end-of-wrap up event to the agent subsystem at block 715 when the agent has finished the contact wrap up procedures.

The agent desktop method 700 also handles the transition of the agent into various states such as break, logout, etc. If the agent is requesting a break (block 717), the agent desktop method 7—sends the break request to the agent subsystem (block 719), which forwards it onto the agent workflow for a decision (as described further below). If the break request is allowed (block 712), the agent desktop method 700 waits for the agent to return from break and sends off-break event to the agent subsystem to inform it that the agent is again available (block 723).

If the agent is logging out (block 725), the agent desktop method 700 sends an agent-logout event into the subsystem at block 729. All other messages are sent to the agent subsystem at block 727. One of skill in the art will readily understand the processing necessary to transition the agent into other states without further illustration.

Figure 7B:
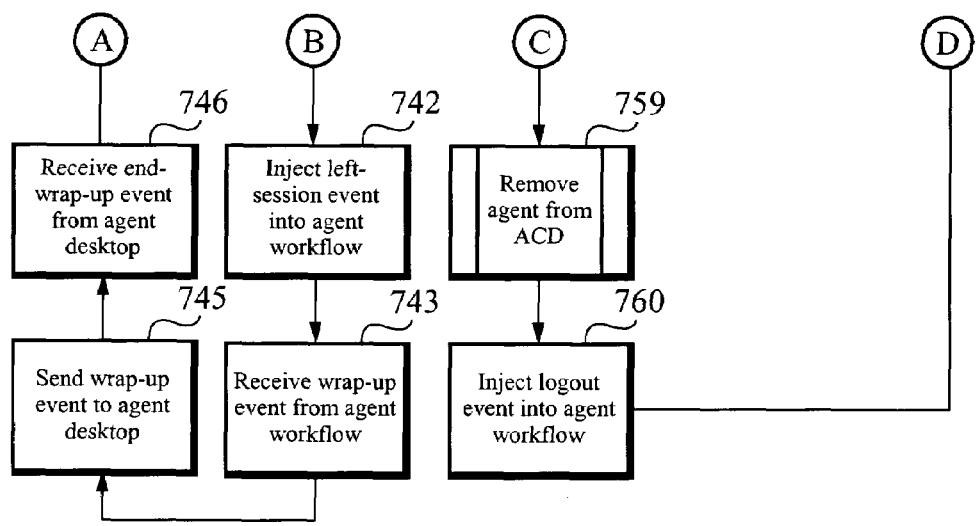

Referring now to FIG. 7B an agent subsystem method 730 executed by the component acting as the agent subsystem 219 is described. The agent information is received from the agent desktop at block 731 when the agent logs into the contact center. The agent subsystem method 730 invokes an agent workflow from the workflow engine 201 at block 733 and waits for events from the agent workflow and the agent desktop 229 (block 735). If the event is a contact request from the agent workflow (Block 736), the agent subsystem method 730 checks to see if there is a pending break request from the agent desktop (Block 737). If not, the agent subsystem method 730 requests a contact for the agent from the dynamic ACD at block 739. Once the dynamic ACD returns a contact, the agent subsystem method 730 injects a handle contact event io the agent workflow (block 740). When the agent or the contact terminates the call or the session, the agent subsystem method 730 receives a left-session event from the corresponding contact workflow, i.e., the voice workflow, the email workflow, the collaboration workflow, at block 741, and injects the event into the agent workflow at block 742. The agent subsystem method 730, in conjunction with the current session or call, also receives a wrap-up event from the agent workflow (block 743), which it sends to the agent desktop (block 745). When the agent desktop has determined that the agent has completely wrapped up the contact, the agent subsystem method 730 receives the end-wrap-up event from the agent desktop at block 746, and in turn, injects the event into the agent workflow at block 747. If a break request is pending (block 737), the agent subsystem method 730 waits until the agent workflow makes a decision on the break request (block 748). If allowed, the agent subsystem method 730 waits block 735 for an off-break event from the agent desktop. If not allowed, the agent subsystem method 730 requests a contact from the dynamic ACD at block 739.

If the agent subsystem method 730 receives a break request from the agent desktop (block 749), it sends an on-break event to the agent workflow (block 770) and waits for a response, which it forwards to the agent desktop at block 751. If the break is allowed by the agent workflow (block 752), the agent subsystem method 730 requests the agent be moved from the agent list by the dynamic ACD at block 753 and waits a block 735 for an off-break event from the agent desktop. When the off-break event is received (block 754), the agent subsystem method 720 injects the off-break event into the agent workflow at block 735 to cause the workflow to request a contact for the now available agent.

If a logout event is received (block 756), the agent subsystem method 730 requests the agent be removed from the agent list by the dynamic ACD (block 759) and injects a logout event into the agent workflow (block 760). The handling of other events is illustrated generically at block 757, where the event is injected into the agent workflow, and at block 758, where the agent subsystem method 730 forwards any response received from the agent workflow to the agent desktop. One of skill in the art will readily understand the processing necessary to handle different types of events without further illustration.

Figure 7C:
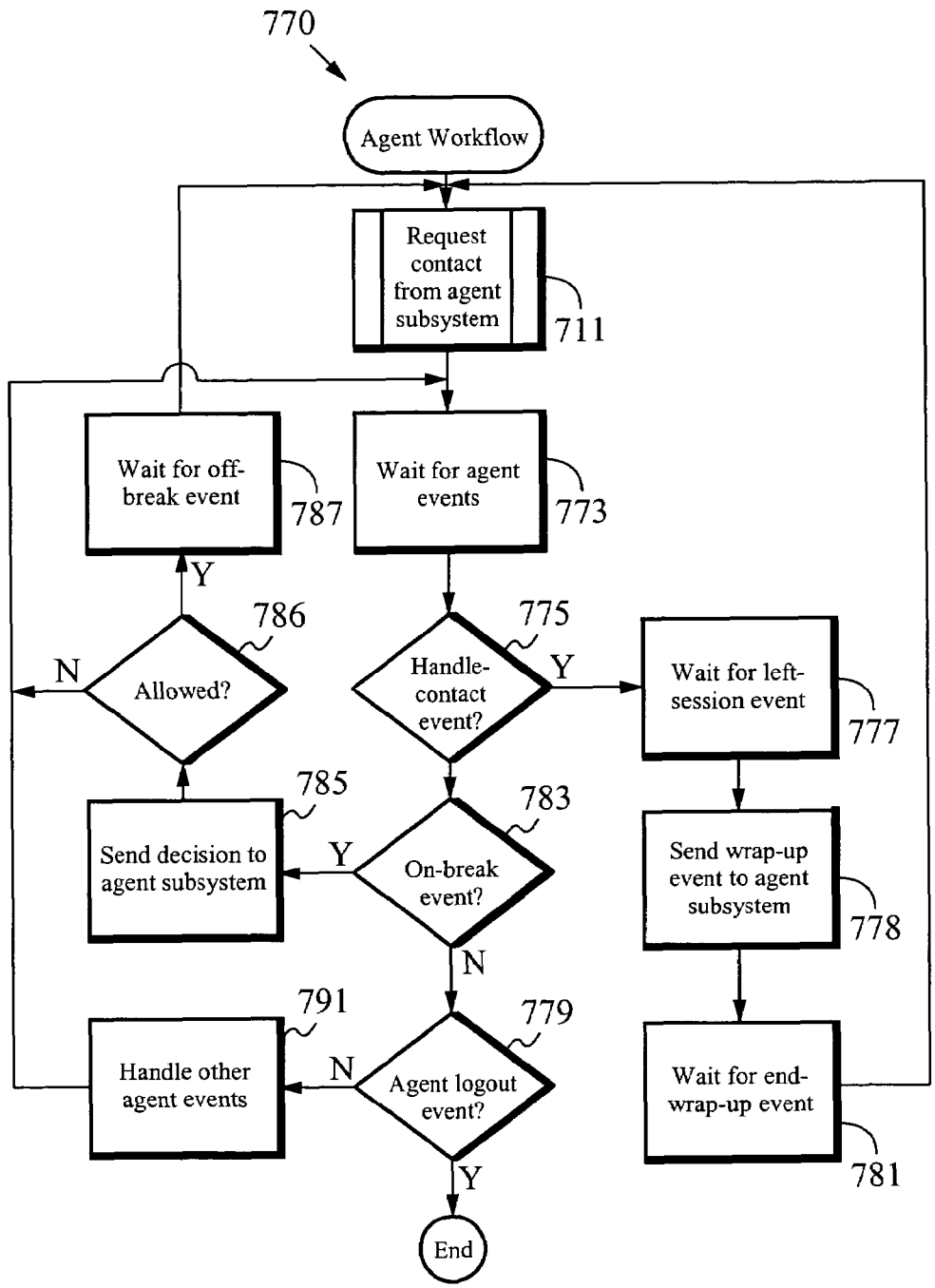

An agent workflow method 770 for an agent workflow is now described in conjunction with FIG. 7C. The agent workflow method 770 begins by requesting a contact for the agent from the agent subsystem at block 771. The agent workflow methods 770 than waits for the agent events at block 773. If a handle-contact event is received (block 753), the agent has been allocated to a contact and the agent workflow methods 770 waits for a left-session event from the corresponding contact workflow that indicates the contact session has terminated (block 777). When the left-session event arrives, the agent workflow method 770 sends a wrap-up event to the agent subsystem at block 778 and waits for an end-wrap-up event that indicates the agent is now available (block 781).

The agent workflow method 770 loops back to block 771 to request a new contact for the agent.

If an on-break event is received by the agent workflow method 770 (block 761), the agent workflow method 770 determines if the break can be allowed based on the status of the call center (block 785). In either case, a message is sent to the agent subsystem to notify the agent desktop of the decision (block 785). If the break is allowed (block 785), the agent workflow waits for an off-break event to be received at block 786. If the break is not allowed, the agent workflow method 770 loops to block 773 to wait for a contact.

If an agent logout event is received by the agent workflow mentioned 770 (block 779), the agent workflow method 770 terminates. In an embodiment not shown, the agent logout event is a request that can be denied based on the stat of the contact center, such as when the contact center is overloaded, or allowed at an appropriate time, such as when the agent workflow requests a new contact. All other events are handled by the agent workflow method 770 as generically illustrated by block 791. One of skill in the art will readily understand the processing necessary to handle different types of events with an agent without further illustration.

It will be appreciated that the workflow described in conjunction with the flow charts 4C, 5C, 6C and 7C are simplified examples of the actions available through the workflow logic 207 and are not intended to limit the invention to only those actions and sequences illustrated. A detailed description of the embodiment of the workflow logic 207 and the workflow actions is given in the next section.

In addition, one of skill in the art will readily conceive of alternate logic flows with more or fewer processes or different processes that achieve the results of these method and such alternatives are considered within the scope of the inventions. For example, instead of having the contact workflow inject the left-session events directly into the agent workflow, in one alternate embodiment, the contact workflow sends a contact-ended event to the contact subsystem and thence to the appropriate media router, which causes the router to send the left-session event to the agent subsystem for injection into the agent workflow. In another alternative embodiment, the termination of the contact workflow causes the contact subsystem to send the contact-ended event to the appropriate media router, causing the router to send the left-session event to the agent subsystem and thence to the agent workflow.

The particular methods performed by components of the alternative embodiment of the digital multimedia contact center of the present invention have been described in terms of media-specific processing diagrams and flowcharts. The methods performed by a voice router, a voice subsystem, and workflow logic for a voice contact have been shown by reference to flowcharts 4A-C including all the acts from 401 until 407, from 421 until 443, and from 451 until 475, respectively. The methods performed by an email escalator, an email subsystem, and workflow logic for an escalated email contact have been shown by reference to flowcharts 5A-C including all the acts from 501 until 515, from 521 until 531, and from 541 until 549, respectively. The methods performed by a collaboration router, a collaboration subsystem, and workflow logic for a collaboration contact have been shown by reference to flowcharts 6A-C including all the acts from 601 until 607, from 621 until 633, and from 641 until 649, respectively. The methods performed by an agent desktop, an gent subsystem and workflow logic for an agent have been shown by reference to flowcharts 7A-C including all the acts from 701 until 729, from 731 until 760, and from 771 until 791, respectively.

Internet Contact Center (iCC) Implementation

In this section of the detailed description, a particular alternative implementation of the invention is described. Companies subscribe to the services of the iCC to manage their customer contacts. The iCC is located remotely from the agents for the subscribers, who may be at various locations. The agent desktops 229 are Web browser-based that connect to the agent subsystem(s) 219 in the remote iCC. The subscriber's customers contact the iCC directly through the Internet or POTS and are then routed to the appropriate agent desktop through a virtual private network. The browser-based agent desktops enables the use of various plug-in applets that extend the basic capabilities of the agent desktop without extensive re-programming. Additionally, a combination Java applet/servlet can be used to implement the desktop manager described previously.

Messaging

Communication between the workflow engine 201 and the media routers 221/agent desktop 229 is handled through a set of interfaces using Java RMI (remote method invocation). Three generic interfaces are provided in a messaging library. All contact workflow subsystems, e.g., voice subsystem 213, collaboration subsystems 215 and email subsystem 217, are required to implement at least a generic contact service interface, such as "ContactWorkflowService Interface" described below. All agent workflow subsystems, e.g., the agent subsystem 219, are required to implement at least a generic agent service interface, such as "AgentWorkflowServiceInterface" described below. Each media router 221 is required to implement at least a generic media router interface, such as "MediaRouterInterface" described below. New interfaces specific to the service requested can be defined that inherit from existing interfaces. Thus, for example, a voice service interface implements generic contact services interface along with interface for telephone commands. Global variables pass information between the workflow subsystem 205 and the workflow logic 207. The global variables contain the values needed by the workflow logic 207. The global variables contain the values needed by the workflow logic 207 in the context of a particular workflow, and requests made by the workflow logic 207 to the workflow subsystems 205 through various workflow steps described further below.

A media router 221 uses the ContactWorkflowService-Interface of a particular contact workflow subsystem to 1) start a contact workflow and receive a contact identifier for the workflow, 2) inject an event into an existing workflow identified by a contact identifier, and 3) determine if the contact workflow subsystem is handling a specified contact. To start a workflow for a contact, a media router 221 invokes a "startWorkflow" method in the ContactWorkflowServiceInterface of the desired contact workflow subsystems, passing in an identifier for the media router interface of the media router (client), and the attributes of the contact (attributes), and receives an identifier for the newly created contact workflow in return (contactID), startWorkflow(client, contactID, attributes).

To inject an event into an exisiting workflow, a media router 221 invokes an "injectEvent" method in the ContactWorkflowServiceInterface of the appropriate contact workflow subsystems, identifying the contact workflow (contact ID) and the event to be injected into the workflow (event) e.g., injectEvent(contactID, event).

To determine if a particular contact workflow subsystem is handling a specific contact, a media router calls a "handleContact" method in the contactWorkflowServiceinterface on the contact workflow subsystems, passing in the identifier of the contact workflow (contactID) and receives a boolean value in return, e.g.

handleContact(contactId).

An agent desktop 229 uses the AgentWorkflowServiceInterface to 1) start an agent workflow and receive an agent identifier for the workflow, 2) inject an event into in existing workflow and receive an agent identifier by an agent identifier, and 3) determines if a particular agent workflow subsystem is managing a specified agent. As described previously, when multiple agent workflow subsystem are present, an agent desktop is assigned to one of the agent workflow subsystems by a service manager. To start an agent workflow, an agent desktop invokes a "startWorkflow" method in the AgentWorkflowServiceInterface of the appropriate agent workflow subsystem, passing in the attributes of the agent (attributes), and receives an identifier for the newly created agent workflow in return (agentID), e.g., startWorkflow(agentID, attributes).

To inject an event into an existing workflow, agent desktop invokes an "injectEvent" method in the AgentWorkflowServiceInterface of the appropriate agent workflow subsystem, identifying the agent workflow (agentID) and the event to be injected into the workflow (event), e.g., injectEvent(agentID, event).

To determine if a particular agent workflow subsystem is handling specific agent, an agent desktop calls a "handlesAgent" method in the AgentworkflowServiceInterface of the agent workflow subsystem, passing in the identifier of the agent workflow (agentID) and receives a boolean value in return, e.g., handleAgent(agentID).

The MedieRouterInterface allows contact workflow subsystems to route contacts to the agents allocated by the dynamic ACD and to terminate a contact session. To route a contact to an agent, a contact workflow subsystem invokes an "assignContactToAgent" method in the MediaRouterInterface of the appropriate media router, passing in the workflow identifier for the contact (contactID) and the workflow identifier for the agent (agentID) and receiving a boolean in return that indicates whether the routing was successful, e.g., assignContactToAgent(contactID, agentID).

To terminate a contact session, a contact workflow subsystem invokes a "teminateContact" method in the iCCMediaRouterInterface of the appropriate media router, passing in the workflowidentifier for the contact (contactID), e.g., terminateContact(contactID).

Database Unification Layer

The database unification layer 261 implements a unified schema consisting of information replicated from a number of different sources including the database used by the third-party systems, and the internal iCC database 231 as described previously.

Each different source is defined in a sub-schema including:
Billing
Customer Relationship Management (CRM)
Entitlement (Billing option, maximum agents, maximum contacts, . . . )
Provisions (Agents, User Ids, Passwords, Classifications, Skills, Proficiencies, . . . )
Business Logic (Priority Expressions, Attributes, Stored Procedures, . . . )
Active State (Agent State, Session State, Contact State, Contact Center State, Customer State).

The database unification layer provides access to the information in the various database through Java classes, such as CRM, Provisioning Entitlement, Rules, Contact Detail Record (CDR), Contact Center State.

The unified schema is synchronized with the vendor-specific sources by a set of database triggers. For instance, many conventional email systems use event handlers that watch for messages entering and changing state, and create and update CDR records as necessary, e.g. when an email message is responded to or forward to another agent. Updating one of the sources with information in the unified schema is accomplished through the Java classes.

Figure 8A:
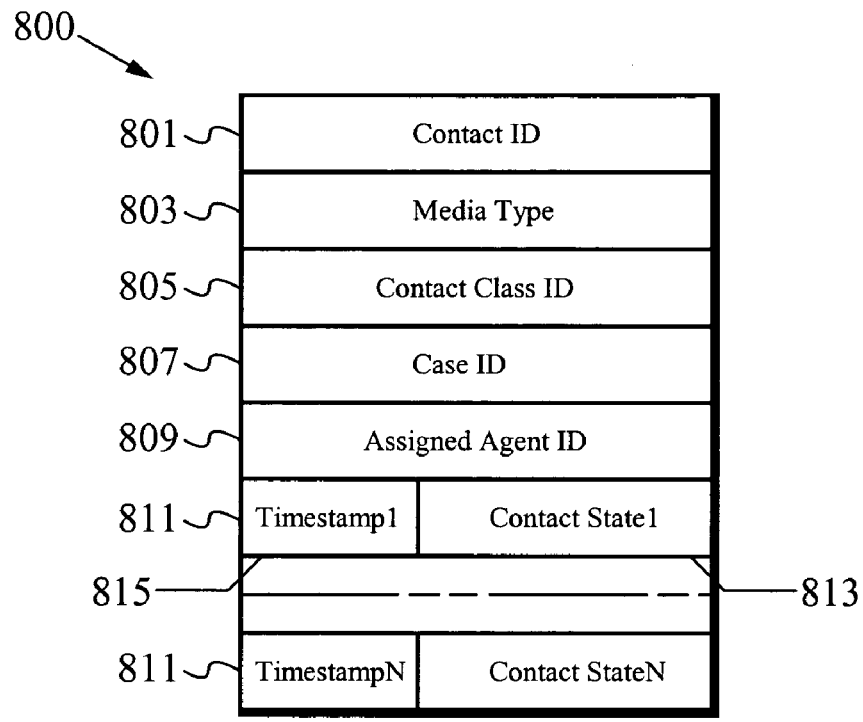
FIG. 8a is a diagram of a contact detail data structure for use in an implementation of the invention.

One embodiment of a data structure 800 for CDR is illustrated in FIG. 8A. The contact represented by the CDR 800 identified through ID field 801. The media type through which the contact has been entered the iCC is specified in a media type field 803. Assuming the contact has been classified, the classification for the contact is stored in a contact class ID field 805. If the iCC is implemented in conjunction with a standard customer relationship management system, the CRM case identifiers is stored in a case ID field 807 to allow tracking of the contact. The agent assigned to handle the contact is identified through an assigned agent ID field 809. One or more fields 811 collectively record the history of the contact as it is process in the iCC. Each field 811 contains a contact state 813 and a timestamp 815. Thus, the change in state of the contact can be tracked chronologically for the life of the contact. Exemplary contact states used by the iCC are shown in Table 1 below and it will be appreciated that more or fewer states may be used.

TABLE 1

| iCC Contact States | |
|---|---|
| State | Comment |
| Initially Created | |
| Escalated | |
| Being Addressed | |
| On Hold | |
| Archived | after wrap-up |
| In Wrap-up | |
| Terminated | no agent assigned |
| Abandoned | contact quits before being helped |
| Queued | |
| Demoted | |

Figure 8B:
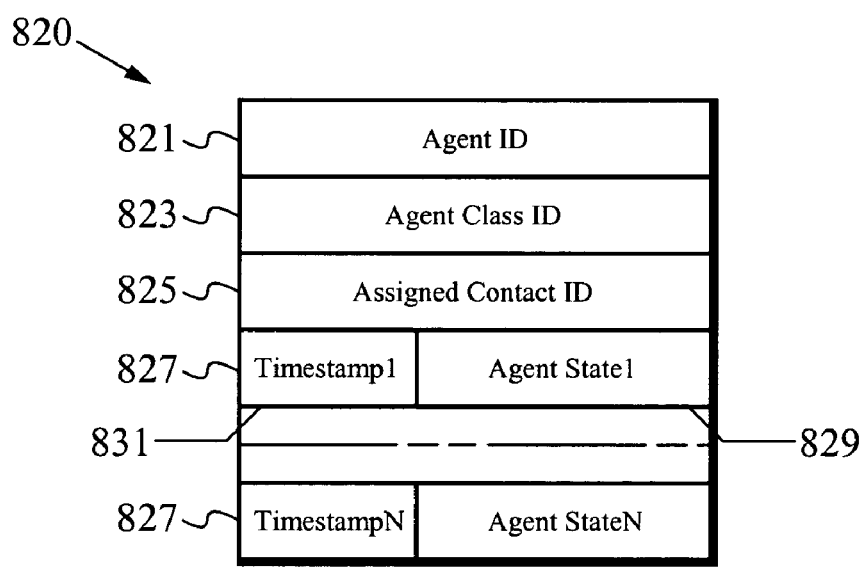
FIG. 8b is a diagram of an agent data structure for use in an implementation of the invention.

One embodiment of a data structure 820 for an agent record is illustrated in FIG. 8B. The agent represented by the agent record 820 is identified by an agent ID field 821.

Assuming the agent has been classified, the classification for the agent is stored in an agent class ID filed 823. The contact identifier for the current contact the agent is handling is stored in an assigned contact ID field 825. One or more fields 827 collectively record the history of the agent while he or she is logged into the iCC. Each field 827 contains an agent state 829 and timestamp 831. Thus, the change in state of the agent can be tracked chronologically during the workdays of the agent. The agent states used by the iCC are shown in Table 2 below and it will be appreciated that more or fewer states may be used.

| State | Comment |
|---|---|
| Logged Out | |
| On Break | |
| Available | Logged in and not assigned a contact |
| Busy | |
| Wrap-up | Post-contact processing |

Soft ACD

The iCC usues software-implemented ACD to manage the allocation of all contacts and agents. The Soft ACD exists as a set of stored procedures in the contact center database that refer to special database tables used as the unordered lists of available agents and waiting contacts. The unordered lists may be further logically subdivided, e.g., by classification.

The Soft ACD also loads business logic and provisioning information (described below) when required. Each classification within the organization (e.g., Sales, Support, Customer Service, etc.) Is associated with a particular set of business logic. If any of this information changes, the Soft ACD is notified, it reloads this information, and immediately applies the new information to the iCC. While it is running, the Soft ACD maintains the state (classification, requirements, and attributes) of each entry in the list.

When running workflow requests as agent or contact, the appropriate subsystem passes the request onto the Soft ACD as previously described. The Soft ACD determines the best match for the agent or contact by filtering the opposite list on classification and in light of any requirements specified in the request, and prioritizing the filter entries using on or more "priority expressions". Each priority expression contains a set of weighed contact/agent attributes that produce a priority from 0 to 100 when an entry is evaluated. The attributes and their weights exist as classes in the business logic sub-schema in the database unification layer and are described next. It should be noted that the Soft ACD dynamically performs the filtering and prioritizing anew for each request for a match.

While a contact or agent is waiting on a list, the requesting workflow is free to continue executing, but when an actual allocation occurs, a resource allocator notifies the corresponding subsystem, which then interrupts the requesting workflow to route the contact.

Business Logic

The business logic used by the iCC for a subscriber is defined through an email manager, a workflow editor, and an administrative interface. The email manager is used to create email rules that route email contacts into various predefined mailboxes. These rules may reference text in the form, to subject and body of the message as well as make database queries. Mailbox queues are separate message areas maintained by the email server. Agents retrieve messages from these queues. Individual queues can be set up e.g., for each agent or for separate products, and additions or deletions to the existing set of queues can be made necessary. For example, the subscriber would initially define one queue per product per classification (SalesPrinters" or "SupportPrinters") and add more as business grows. The system administrator grants Access to these queues on a per agent basis. An additional queue is defined for escalated email messages as previously described. After defining the queues, the rules which route messages into those queues are defined. Rules can also be specified that demote certain email messages into self-service by routing them to the auto-responder function.

The workflow editor defines a workflow for handling a contact or an agent. A subscriber may define any number of agent and contact workflows through the workflow editor. For example, each agent might have a particular workflow based on the agents's login identifier. The workflows and their related invocation information are stored for reference by the workflow engine 201 in an LDAP directory server or other directory structure that defines hierarchy directory entries. For example, a subscriber might define the following hierarchy in which the entries at levels (a) and (b) are the invocation information for the workflows specified.

1) subscriber.com
    a) iCC
        i) configuration
            (1) wfVoice
                (a) 1234
                      (i) Workflow "SalesContact, WFE"
                (b) 1000
                      (i) Workflow "SupportContact, WFE'
            (2) wfEmail
                (a) sales@asubscriber.com
                      (i) Workflow "SalesContact.WFE"
                (b) support@asubscriber.com
                      (i) Workflow "SupportContact.WFE"
            (3) wfWebCollaboration
                (a) http://asubscriber.com/sales
                      (i) Workflow "SalesContact.WFE"
                (b) http://asubscriber.com/support
                      (i) Workflow "supportContact.WFE"

The administrative interface uses the classes in the business logic sub-schema to define logins, passwords, agent skills and proficiencies, call center classification, service level objectives, email overdue/escalation thresholds, priority expressions, attributes, attribute weightings etc. The administrative interface starts up, it reads the system and subscriber business logic from the database using the business logic classes. When entities are changed, the relevant data is written back to the database through these same business logic classes. The administrative interface presents the subscriber with various graphical user interface (GUI) screen to assist the user in defining the subscriber business logic.

Through one of the GUI screens, the subscriber sets up the call center classifications, which define gross distinctions between contacts or between agents. The same set of classifications is used both contacts and agents. Within a particular classification, the subscriber defines service level objectives for each media type. Service level objectives are defined as the percentage of contacts of a particular media type which must be handled in a specific time. Thus, the GUI screen for defining service level objectives presents the user with a list of the media types, an input area for a percentage value, and an input area for an elapsed time value.

Each agent has a set of skills and a proficiency within each skill, which are specified and modified through the administrative interface. When a contact requests an agent, certain skills/proficiencies may be specified as contact requirements. The requirements may also include aging information doe relaxing those requirements after a certain amount of time has elapsed without the contact being helped. For instance, the aging information might say that for the first 30 seconds a particular voice call will accept a proficiency of 5 for a particular skill, after 30 seconds a proficiency of 2 will be acceptable. This is referred to as "aging" requirement.

The iCC comes pre-configured with a number of system defined attributes including:

TimeInQueue—the time a contact has been waiting for a resource (available through a database stored procedure and calculated on the fly by the Software ACD.)

IsEmail—is this contact an email?

IsVoice—is this contact a voice call?

IsCollaboration—is this contact a web collaboration?

MediaServiceLevel—percentage of contacts of this media type handled within the specified media-specific service objective.

LastAgent—User Id of last agent this customer talked to.

Subscriber-defined attributes that determine a contact-agent match are specified through the administrative interface. Attribute characteristics include name, type (Call center, Agent, Contact), value type (numeric, symbolic), values, default values, value normalization, and corresponding stored procedure. The subscriber defines the set of attributes using a GUI screen that prompts the user for input by displaying permitted choices or through visual clues, such as a choice of normalization curves. The stored procedure for an attribute calculates a value for the attribute when the attribute is used in a priority expression. The stored procedures can have been previously created or may be created when the attribute is created.

The agent and contact priority expressions are created through a graphical user interface that allows an administrator to drag-and-drop desired attributes into an expression and set their weighting through slider bars. There is one priority expression for agents and one for contacts within each classification. When a new priority expression is specified, a new stored procedure is generated in a database scripting language, such as PL/SQL, compiled, and added to the database. One exemplary priority expression is shown in the following pseudocode:

For each attribute:
Call the attribute's stored procedure passing ContactID and CustomerID;
If value returned is −1, use the attribute's default value;
If the attribute is symbolic, convert to a normalized value;
Multiply results by specified weighting and add this to the accumulated total.

For a more specific example, assume a subscriber specified two classifications "Sales" and "Support" and contact a attribute called "BusinessValue" (i.e., the value of this contact to the subscriber's business). For the Sales classification, the subscriber created a contact priority expression of:

BusinessValue*0.2+TimeInQueue*0.1+IsEmail*0.1+IsVoice*0.4+IsCollaboration*0.2 and for the Support classification, a contact priority expression of:

BusinessValue*0.1+TimeInQueue*0.1+IsEmail*0.1+IsVoice*0.6+IsCollaboration*0.1

When the Soft ACD is prioritizing the waiting contacts for assignment to an agent, it evaluates the expression for each contact of the appropriate classification by calling the stored procedure associated with the BusinessValue attribute and multiplying the value returned by 0.2 for a Sales contact or 0.1 for Support contact. The weighted business value of the contact is then added to the appropriately weighted values of the system defined attributes to calculation the priority for the contact.

The Soft ACD can prioritize each agent/contact before deciding on the Appropriate match or alternately may employ an optimization scheme in which the first agent/contact that reaches a pre-determined priority value is chosen.

Provisioning Information

The underlying components of iCC must set up and configured before the center is ready for operation. The email manager allows administrators to define agents, agent passwords, mailboxes, as well as the rules by which contacts are routed to these mailboxes. An Administration interface to the collaboration server is used to define agents, agent passwords, and agent extensions. The telephony server is set up by creating dial plans and associating phone numbers with applications, and agents with phone extensions.

Workflow Engine

The iCC uses workflows to process contact, manage agents, and control the overall contact center functions. Workflow steps are the basic building blocks of control in the iCC workflow engine. The workflow steps available to a designer depend on the type of workflow being developed. For example, voice workflow steps include answer, collects digits, and record. Exemplary agent workflow steps include allow break, handle contact, and wrap up. Some workflow steps are applicable to all contacts workflows, such as classify contact, request agent, and deliver contact. Control steps, e.g., end, wait, and id, are available for all workflows, along with a send email step. Additional steps for the contact and agent workflows will be readily apparent to one of skill in the art.

Figure 9A:
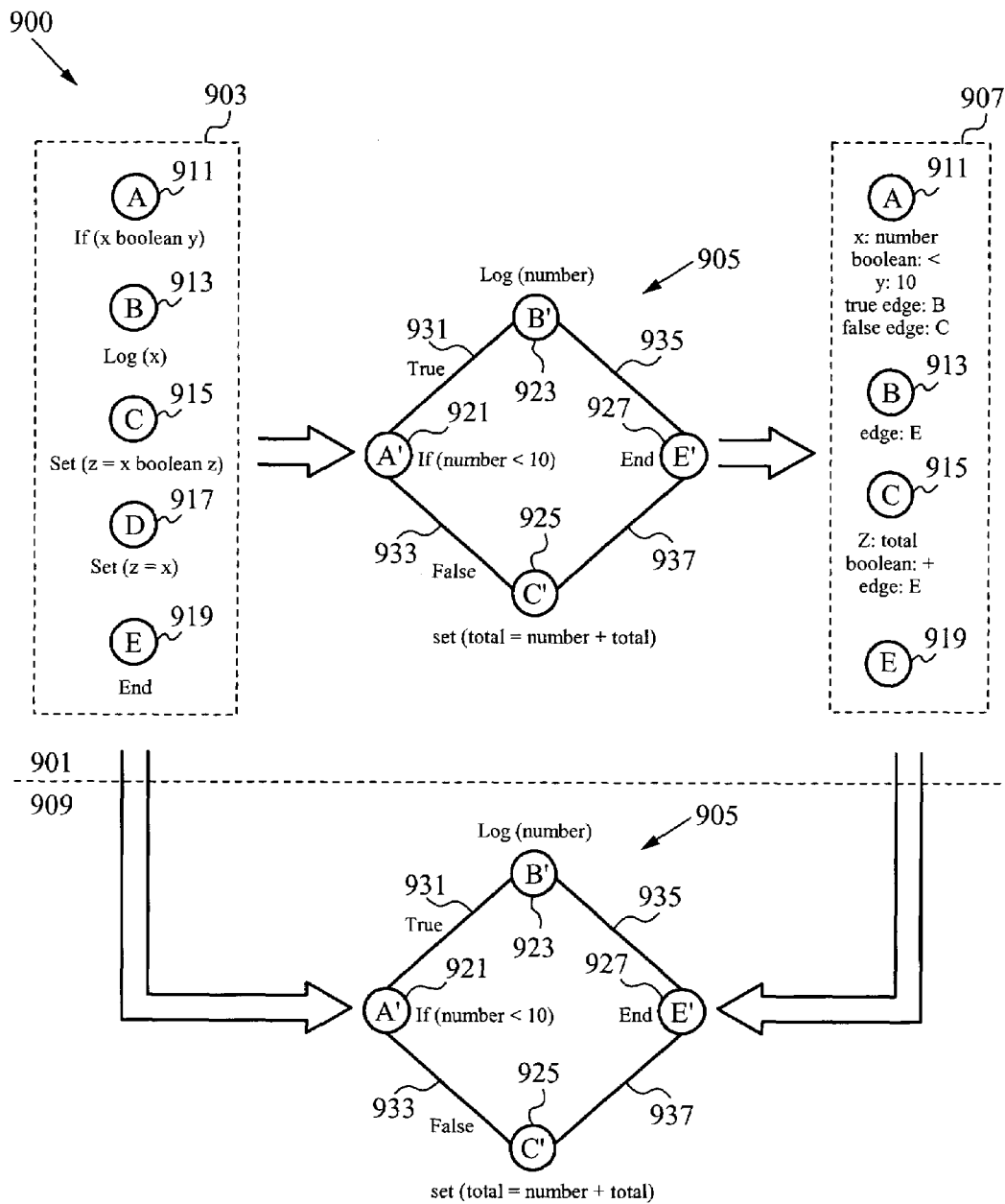
FIG. 9a is a diagram of a workflow engine for use in an implementation of the invention.

Instead of hard-coded scripts typically used to implement workflows, the iCC workflow engine 900 dynamically creates a script for a workflow from two files as described in conjunction with FIG. 9A. Definitions for prototype nodes 911, 913, 915, 917, 919 are stored in a template file 903. Each node is associated with workflow code that implements a high-level, compound script action, such as "play menu with interruptible prompts" or "play music until an agent is available", that are available to the workflow engine 900. The script actions are built from workflow steps. For ease of explanation, the script actions represented in FIG. 9A are simple, single commands, e.g., node A 911 represents the function "if(x boolean y)," where "x," "boolean," and "y" are parameters that will be replaced by values specified by an instance of the node A 911. It will be appreciated that the invention is not limited by the example or by the workflow steps shown herein.

When in configuration mode 901, the workflow engine 900 (or a supporting application) enables a user, such as a system administrator, to create a workflow 905 by selecting the appropriate nodes from the template file 903, specifying the appropriate values for the parameters in the script command, and linking the nodes together to form a directed graph that represents the desire workflow. Thus, for example, when node A 921 is executed, the function "if(number<10)" is evaluated, with a true result causing edge 933 to be followed to execute node C' 925. A configuration file 907 is created from the directed graph and specifies the structure for the workflow 905. The configuration file 907 contains an identifier for each corresponding prototype node, along with the values, edge information and other settings (configuration data) associated with each node in the graph. It will be appreciated that any of the common input methodologies used to obtain user input can be employed to create the directed graph for the workflow, including a graphical user interface that gives the user drag-to-drop capabilities to allow the placement an d rearrangement of nodes and edges, and dialog boxes that request the appropriate parameters.

When the workflow 905 is to be executed by the workflow engine 900 in runtime mode 909, the workflow engine 900 references the configuration file 907 and reconstructs the directed graph for the workflow 905 in memory by merging the corresponding prototype node from the template file 903 with the configuration data associated with the nodes in the configuration of 907. The workflow engine initiates a new thread of execution to execute the workflow script represented by the directed graph. Thus, the workflow engine 900 abstracts out the code and connectors when the user creates a workflow and subsequently reconstructs the workflow from the abstractions when it is to be executed.

Unlike typical workflow implementations, all iCC workflow steps can execute asynchronously by storing its results to a prioritized message queue in its thread of execution. Additionally, a step may spawn another execution thread to create a multithread workflow. Similar classes of steps may share one queue with one execution thread for all requests of that type from a single workflow or across workflows. As previously described, various workflow steps request a service from a subsystem. The subsystems inject service events into the workflow by placing event notifications in the message queue. The retrieval of messages from the queue is implemented using three special workflow steps: RegisterEvent, UnRegisterEvent, and GetMessage.

RegisterEvent and UnRegisterEvent modify handlers for events. By default, an event is handled-in-line in the node that caused the event. RegisterEvent specifies a target node that will handle the event instead (referred to as "chaining"). Handlers are stacks when a handler is registered using RegisterEvent, the target node for the that event is pushed onto the stack; when UnregisterEvent is called, the stack is popped.

The GetMessage step fetches a message from the queue. When the message is an event notification for which a registration (via RegisterEvent) has been made, the workflow engine branches to the target node to handle the event. If the event was not explicitly registered, the current node is pushed onto the stack to handle the event.

Figure 9B:
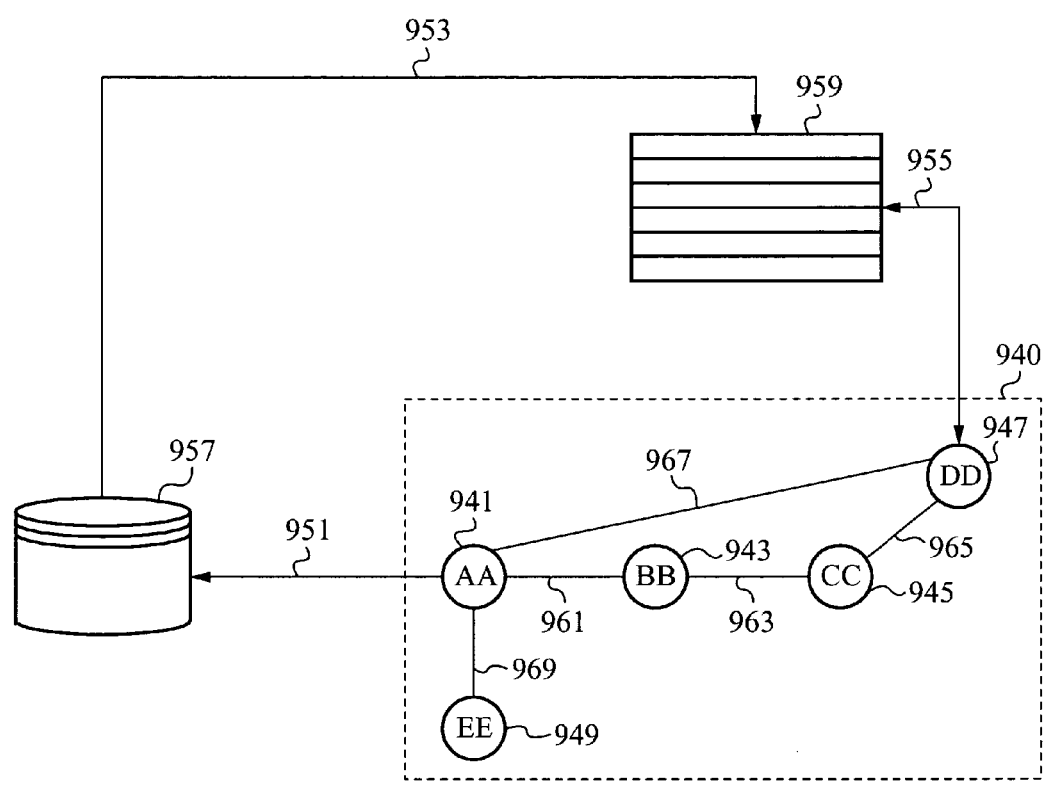

An example of the asynchronous processing of the workflow steps is illustrated in FIG. 9B. A workflow 904 begins at node AA 941. As part of its codes, node AA 941 requests (arrow 951) that the database subsystem retrieve a record from the unified database 975. When the record is retrieved, the database subsystem stores (arrow 953) an event notification in a message queue 959. Instead of waiting for the database subsystem to retrieve the record, the node AA 942 registers itself as the target node to handle the event. The workflow continues processing, executing node BB 943 and node CC 945, before reaching node DD 947, which requests (arrow 955) messages from queue 959. Assuming that the event notification is in the queue 959, it will be returned (arrow 955) to node DD 947, which in turns, returns (edge 967) the event notification to node AA 941 for handling. Once node AA 941 has received the record, it passes (edge 969) it onto node EE 949 for further processing.

In one embodiment, the template and configuration files are XML documents with the nodes represented by XML elements and the code and configuration information stored as XML attributes for the corresponding XML elements. The code and configuration information are written in the JPython scripting language. A JPython aware execution proxy merges the information from the template and configuration files, and provides and interface between the thread of execution for the workflow and the actual workflow steps. Because the execution proxy insulates the thread of execution from the workflow steps, steps may use multiple scripting languages simultaneously, allowing the developer of the prototype nodes to chose the best code to perform a given function.

Operating Environment

Figure 10A:
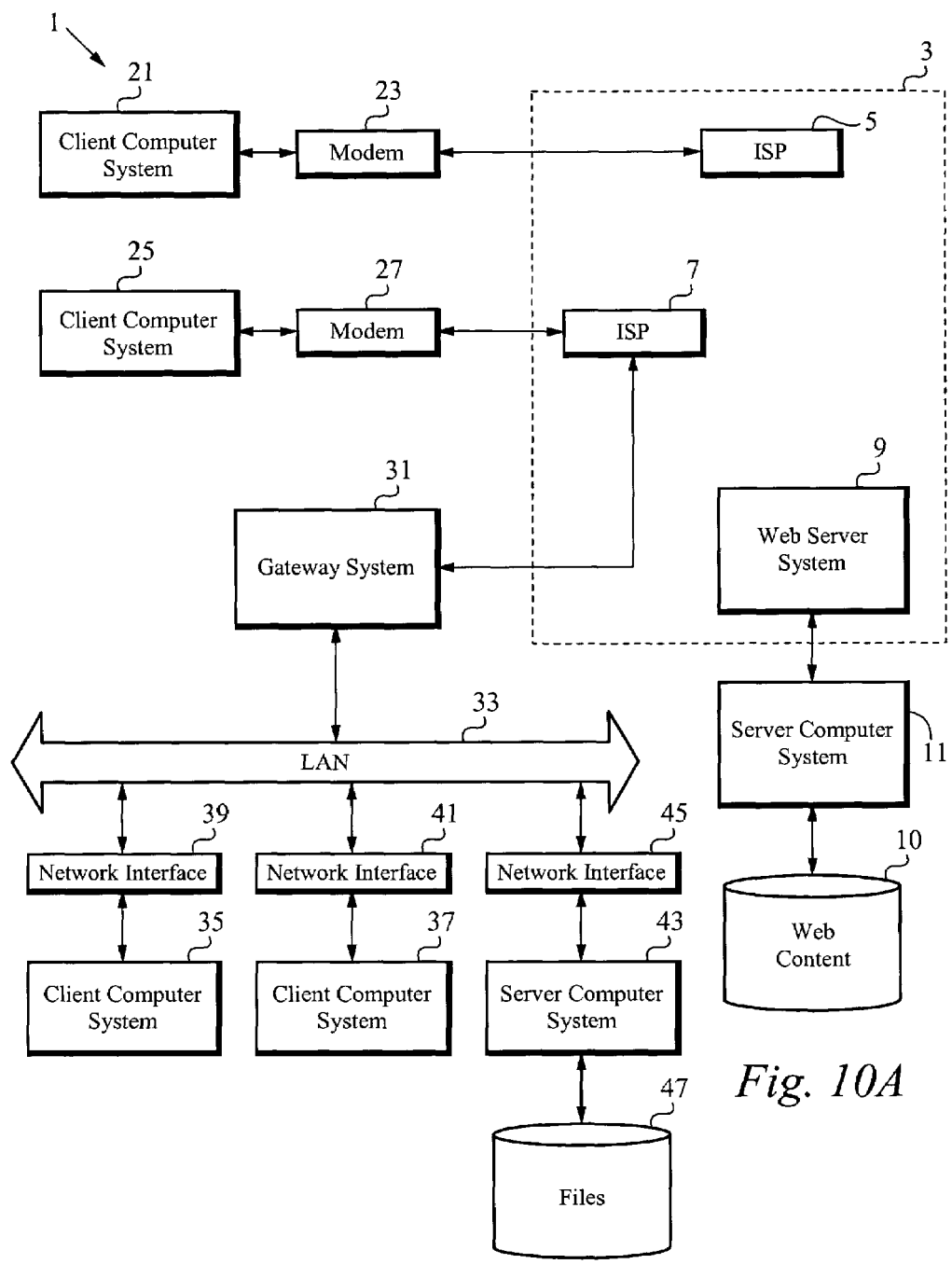
FIG. 10a is a diagram of one embodiment of an operating environment suitable for practicing the present invention.
Figure 10B:
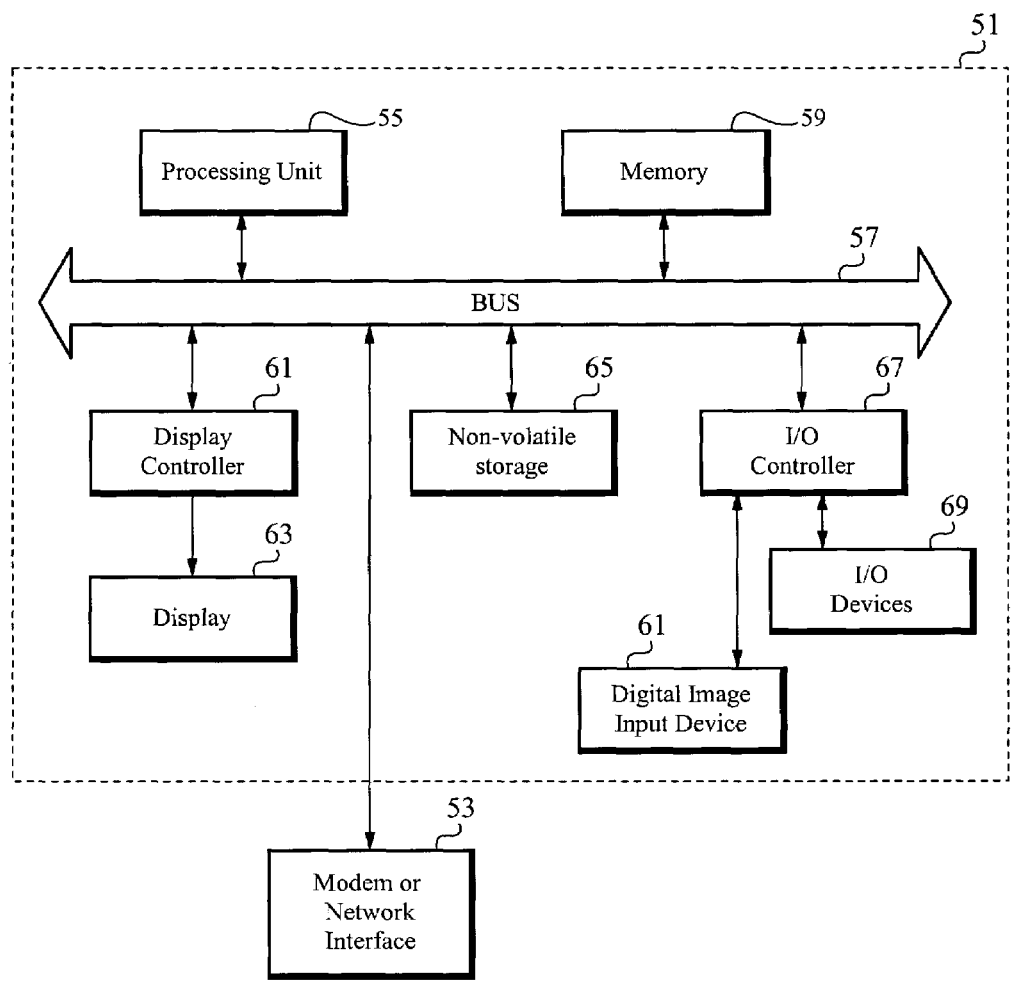

The following description of FIGS. 10A-B is intended to provide an overview of computer hardware and other operating components suitable for alternatively implementing the invention, but is not intended to limit the applicable environments. One of skill in the art will immediately appreciate that the invention can be practiced with other computer system configurations, including hand-held devices, multiprocessor systems, microprocessor-based or programmable consumer electronics, network PC's, minicomputers, mainframe computers, and the like. The invention can also be practiced in distributed computing environments where tasks are performed by remote processing devices that are linked through a communications network.

FIG. 10A shows several computer systems 1 that are coupled together through a network 3, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connection of the Internet and the protocols and communication procedures of the Internet are well known to those of skill in the art. Access to the Internet 3 is typically provided by Internet service providers (ISP), such as the ISP's 5 and 7. Users on client systems, such as client computer system 21, 25, 35, and 37 obtain access to the Internet through the Internet service providers, such as ISP's 5 and 7. Access to the Internet allows users of the client computer systems to exchange information, receive and send e-mails, and view documents, such as documents which have been prepared in the HTML format. These documents are often provided by web servers, such as web server 9 which is considered to be "on" the Internet. Often these web servers are provided by the ISPs, such ISP5, although a computer system can be set up and connected to the Internet without that system being also an ISP as is well known in the art.

The web sever 9 is typically at least one computer system which operates as a server computer system and is configured to operate with the protocols of the World Wide Web and is coupled to the Internet. Optionally, the web server 9 can be part of an ISP which provides access to the Internet for client systems. The web server 9 is shown coupled to the server computer system 11 which itself is coupled to web content 10, which can be considered a form of a media database. It will be appreciated that while two computer systems 9 and 11 are shown in FIG. 10A, the web server system 9 and the server computer system 11 can be one computer system having different software components providing the web server functionality and the server functionality provided by the server computer system 11 which will be described further below.

Client computer systems 21, 25, 35, and 37 can each, with the appropriate web browsing software, view HTML pages provided by the web server 9. The ISP 5 provides Internet connectivity to the client computer system 21 through the modem interface 23 whih can be considered part of the client computer system 21. The client computer system can be a personal computer system, a network computer, a Web TV system, or other such computer system. Similarly, the ISP 7 provides Internet connectivity for client systems 24, 35, and 37, although as shown in FIG. 10A, the connections are not the same for these three computer systems. Client computer system 25 is coupled through a modem interface 27 while client computer systems 35 and 37 are part of a LAN. While FIG. 10A shows the interfaces 23 And 27 as generically as a "modem" it will be appreciated that each of these interfaces can be an analog modem, ISDN modem, cable modem, satellite transmission interface (e.g. "Direct PC"), or other interfaces for coupling a computer system to other computer systems. Client computer systems 35 and 37 are coupled to LAN 33 through network interfaces 39 and 41, which can be Ethernet network or other network interfaces. The LAN 33 is also coupled to a gateway computer system 31 which can provide firewall and other Internet related services for the local area network. This gateway computer system 31 is coupled to the ISP 7 to provide Internet connectivity to the client computer system. Also, the web server system 9 can be conventional server computer system.

Alternatively, as well-known, a server computer systems 43 can be directly coupled to the LAN 33 through a network interface 45 to provide files 47 and other services to the clients 35, 37, without the need to connect to the Internet through the gateway system 31.

FIG. 10B shows one example of a conventional computer system that can be used as a client computer system or a server computer system or as a web computer system. It will also be appreciated that such a computer system can be used to perform many of the functions of an Internet service provider, such as ISP 105. The computer system 511 interfaces to external systems through the modem or network interface 53. It will be appreciated that the modem or network interface 53 can be considered to be part of the computer system 51. This interface 53 can be an analog modem, ISDN modem, cable modem, token ring interface, satellite transmission interface (e.g. "Direct PC"), or other interfaces for coupling c computer system to other computer systems. The computer system 51 includes processor 55, which can be a conventional microprocessor such as an Intel Pentium microprocessor or Motorola Power PC microprocessor. Memory 59 is coupled to the processor 55 by a bus 57. Memory 59 can be dynamic random access memory 9DRAM) and can also include static RAM (SRAM). The bus 57 couples the processor 55 to the memory 59 and also to non-volatile storage 65 and to display controller 61 and to the input/output (I/O) controller 67. The display controller 61 controls in the conventional manner a display on a display device 63 which can be a cathode ray tube (CRT) or liquid crystal display. The input/output devices 69 can included a keyboard disk drives, printers, a scanner, and other input and output devices, including a mouse or other pointing device. The display controller 61 and the I/O controller 67 can be implemented with conventional well known technology. A digital image input device 71 can be a digital camera which is coupled to an I/O controller 67 in order to allow images from the digital camera to be input into the computer system 51. The non-volatile storage 65 is often a magnetic hard disk, an optical disk, or another form of storage for large amounts of data. Some of this data is often written, by a direct memory access process, into memory 59 during execution of software in the computer system 51. One of skill in the art will immediately recognize that the term "computer readable medium" included any type of storage device that is accessible by the processor 55 and also encompasses a carrier wave that encodes a data signal.

It will be appreciated that the computer system 51 is one example of many possible computer systems which have different architectures. For example, personal computers based on an Intel microprocessor often have multiple buses, one of which can be an input/output (I/O) bus for the peripherals and one that directly connects the processor 55 and the memory x59 (often referred to as a memory bus). The buses are connected together through bridge components that perform any necessary translation due to differing bus protocols.

Networks computers are another type of computer system that can be used with the present invention. Network computers do not usually include a hard disk or other mass storage, and the executable programs are loaded from a network connection into the memory 59 for execution by the processor 55. A Web TV system, which is known in the art, is also considered to be a computer system according to the present inventions, but it may lack some of the features shown in FIG. 10B, such as certain input or output devices. A typical computer system will usually include at least a processor, memory, and a bus coupling the memory to the processor.

It will also be appreciated that the computer system 51 is controlled by operating system software which includes a file management systems, such as a disk operating system, which is part of the operating system software. One example of an operating system software with its associated file management system software in the Windows family of operating systems from Microsoft Corporation of Redmond, Wash., and the associated file management systems. The file management system is typically stored in the non-volatile storage 65 and causes the processor 55 to execute the various acts required by the operating system to input and output data and to store data in memory, including storing files on the non-volatile storage 65.

CONCLUSION

A preferred embodiment of the present invention includes a system and method of escalating non-realtime communications in a Contact Center 1100 having a hub and node architecture as incorporated by reference. An alternative tiered service model providing escalation and de-escalation of contacts in a multimedia digital contact center has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptions or variations of the present invention.

The terminology used in this application with respect to networks is meant to include all of network environments, including private wide-area networks and local-area networks. Therefore, it is manifestly intended that this invention be limited only by the following claims and equivalent thereof.

The present invention has been described in terms of specific embodiments incorporating details to facilitate the understanding of the principles of construction and operation of the invention. Such reference herein to specific embodiments and details thereof is not intended to limit the scope of the claims appended hereto. For example, the system and method of the present invention may be implemented in a Contact Center other than those incorporated by reference and described in this document. It will be apparent to those skilled in the art that modifications can be made in the embodiment chosen for illustration without departing from the spirit and scope of the invention.

What is claimed is:

1. A method of escalating non-realtime customer communications in a contact, the method comprising:
  receiving said customer communications from customers, in a plurality of shared file folders, said shared file folders configured in a central processing area of the contact center;

designating at least one of said customer communications as aged based on a set of predetermined escalation criteria;

extracting the at least one aged customer communication from the plurality of shared file folders;

routing the aged customer communication with an escalation service to an immediate workflow such that the aged customer communication is routed by the immediate workflow for immediate response to a first designated agent of a plurality of designated agents that send responses to customers;

presenting the aged customer communication to the first designated agent such that the aged customer communication is displayed on a desktop of the first designated agent; and sending, under the direction of said first designated agent, a response to a customer associated with the aged customer communication on the desktop, wherein the escalation service is operable to escalate an immediate customer communication to the immediate workflow for routing to the first designated agent and wherein the escalation service checks a present threshold for a maximum number of immediate workflows and delays escalating the customer communications designated as immediate until the number of immediate workflows is below the threshold.

2. The method as claimed in claim 1 wherein the desktop includes a visual indicator, further wherein the visual indicator includes an expiration time for the aged customer communication in the plurality of shared file folders.

3. The method as claimed in claim 1 wherein the customer communication is designated as immediate based on the set of predetermined escalation criteria before the customer communication becomes aged.

4. The method as claim in claim 1 further comprising monitoring the aged customer communication displayed on the first designated agent's desktop, wherein when the first designated agent does not answer the aged customer communication, the immediate workflow routes the aged customer communication to a second designated agent.

5. The method as claimed in claim 4 further comprising sending an acknowledgment message when the first and second designated agents are unavailable.

6. The method as claimed in claim 4 further comprising prompting the first designated agent when the step of responding does not occur within a predetermined timeout period after the step of presenting.

7. The method as claimed in claim 6 wherein the aged customer communication is routed to the second designated agent after the prompting step is unanswered by the first designated agent.

8. The method as claimed in claim 6 wherein the aged customer communication is routed to the second designated agent after the first designated agent answers the prompting step by declining to respond to the aged customer communication.

9. The method as claimed in claim 4 wherein the first and second designated agents may select non-realtime customer communications from the plurality of shared file folders that are not designated as aged, and further wherein the first and second designated agents respond to those non-realtime customer communications not designated as aged.

10. The method as claimed in claim 1 further comprising:
changing the set of predetermined escalation criteria during the responding step.

11. The method as claimed in claim 1 wherein an agent is designated based on a set of predetermined designation criteria.

12. A method of escalating non-realtime communications in a contact center, the method comprising:

extracting an aged communication from a plurality of shared file folders, wherein the plurality of shared file folders are configured in a central processing area of the contact center, and further wherein a communication is designated as aged based on a set of predetermined escalation criteria;

routing the aged communication with an escalation service to an immediate workflow such that the aged communication is routed by the immediate workflow to a first designated agent for immediate response to;

presenting the aged communication to the first designated agent such that the aged communication is displayed on a desktop of the first designated agent; and responding to the aged communication, wherein the first designated agent answers the aged communication on the desktop, wherein the escalation service is operable to escalate an immediate communication to the immediate workflow for routing to the first designated agent and wherein the escalation service checks a present threshold for a maximum number of immediate workflows and delays escalating the customer communications designated as immediate until the number of immediate workflows is below the threshold.

13. A system for escalating non-realtime customer communications in a contact center, the system comprising:

means for receiving said customer communications from customers, in a plurality of shared filed folders, in said contact center;

means for designating at least one of said customer communications as aged based on a set of predetermined escalation criteria;

means for extracting the aged customer communication from the plurality of shared file folders;

means for routing the aged customer communication with an escalation service to an immediate workflow such that the aged customer communication is routed by the immediate workflow for immediate response to a first designated agent of a plurality of designated agents that send responses to customers;

means for presenting the aged customer communication to the first designated agent such that the aged customer communication is displayed on a desktop of the first designated agent; and means for sending, under the direction of said first designated agent, a response to a customer associated with the aged customer communication on the desktop, wherein the escalation service is operable to escalate an immediate customer communication to the immediate workflow for routing to the first designated agent and wherein the escalation service checks a present threshold for a maximum number of immediate workflows and delays escalating the customer communications designated as immediate until the number of immediate workflows is below the threshold.

14. The system as claimed in claim 13 wherein the desktop includes a visual indicator, further wherein the visual indicator includes an expiration time for the aged customer communication in the plurality of shared file folders.

15. The system as claimed in claim 13 wherein the customer communication is designated as immediate based on the set of predetermined escalation criteria.

16. The system as claimed in claim 13 further comprising means for monitoring the aged customer communication displayed on the first designated agent's desktop, wherein when the first designated agent does not answer the aged customer communication, the immediate workflow routes the aged customer communication to a second designated agent.

17. The system as claimed in claim 16 further comprising means for sending an acknowledgment message when the first and second designated agents are unavailable.

18. The system as claimed in claim 16 further comprising means for prompting the first designated agent when the means for responding are not activated within a predetermined timeout period after the means for presenting displays the aged customer communication on the desktop of the first designated agent.

19. The system as claimed in claim 18 wherein the aged customer communication is routed to the second designated agent after the means for prompting is unanswered by the first designated agent.

20. The system as claim in claim 18 wherein the aged customer communication is routed to the second designated agent after the first designated agent answers the means for prompting by declining to respond to the aged customer communication.

21. The system as claimed in claim 16 wherein the first and second designated agents may select non-realtime customer communications from the plurality of shared file folders that are not designated as aged, and further wherein the first and second designated agents respond to those non-realtime customer communications not designated as aged.

22. The system as claimed in claim 13 further comprising:
means for changing the set of predetermined escalation criteria when the means for responding are activated.

23. The system as claimed in claim 13 wherein an agent is designated based on a set of predetermined designation criteria.

24. A system for escalating non-realtime communications in a contact center, the system comprising:
means for extracting an aged communication from a plurality of shared file folders, wherein the plurality of shared file folders is configured in a central processing area of the contact center, and further wherein a communication is designated as aged based on a set of predetermined escalation criteria;
means for routing the aged communication with an escalation service to an immediate workflow such that the aged communication is routed by the immediate workflow for immediate response to a first designated agent;
means for presenting the aged communication to the first designated agent such that the aged communication is displayed on a desktop of the first designated agent; and
means for responding to the aged communication, wherein the first designated agent answers the aged communication on the desktop,
wherein the escalation service escalates an immediate communication to the immediate workflow for routing to the first designated agent and wherein the escalation service checks a present threshold for a maximum number of immediate workflows and delays escalating the customer communications designated as immediate until the number of immediate workflows is below the threshold.

25. A system of escalating a non-realtime customer communication in a contact center, comprising:
a plurality of shared file folders where the non-realtime customer communication is received and stored, wherein the plurality of shared file folders are configured in a central processing area of the contact center, and further wherein a customer communication designated as aged based on a set of predetermined escalation criteria;
an escalation service coupled with the plurality of shared file folders such that the escalation service routes the aged customer communication to an immediate workflow; and
a plurality of desktops for use by designated agents that send responses to customers, said desktops adapted such that the aged customer communication is displayed on a desktop of a first designated agent after receiving the aged customer communication from the immediate workflow,
wherein the first designated agent provides an immediate response to a customer associated with the aged customer communication on the desktop, and further wherein the escalation service is operable to escalate an immediate customer communication to the immediate workflow for routing to the first designated agent and wherein the escalation service checks a present threshold for a maximum number of immediate workflows and delays escalating the customer communications designated as immediate until the number of immediate workflows is below the threshold.

26. The system as claimed in claim 25 wherein the desktop includes a visual indicator, further wherein the visual indicator includes an expiration time for the aged customer communication in the plurality of shared file folders.

27. The system as claimed in claim 25 wherein the customer communication is designated as immediate based on the set of predetermined escalation criteria before the customer communication becomes aged.

28. The system as claimed in claim 25 further comprising a second designated agent, wherein when the first designated agent does not answer the aged customer communication, the immediate workflow routes the aged customer communication to the second designated agent.

29. The system as claimed in claim 28 further comprising sending an acknowledgment message when the first and second designated agents are unavailable.

30. The system as claimed in claim 28 wherein the aged customer communication is routed to the second designated agent after the first designated agent does not answer the prompt.

31. The system as claimed in claim 28 wherein the aged customer communication is routed to the second designated agent after the first designated agent answers the prompt by declining to respond to the aged customer communication.

32. The system as claimed in claim 28 wherein the first and second designated agents may select non-realtime customer communications from the plurality of shared file folders that are not designated as aged, and further wherein the first and second designated agents respond to those non-realtime customer communications not designated as aged.

33. The system as claimed in claim 25 wherein the first designated agent is prompted when the first designated agent does not respond within a predetermined timeout period after the aged customer communication is displayed on the desktop.

34. The system as claimed in claim 25 further comprising:
means for changing the set of predetermined escalation criteria while the first designated agent responds to the aged customer communication.

35. The system as claimed in claim 25 wherein an agent is designated based on a set of predetermined designation criteria.

36. A system of escalating a non-realtime communication in a contact center, comprising:

a plurality of shared file folders where the non-realtime communication is received and stored, wherein the plurality of shared file folders are configured in a central processing area of the contact center, and further wherein an aged communication is extracted from the plurality of shared file folders based on a set of predetermined escalation criteria;

an escalation service coupled with the plurality of shared file folders such that the escalation service routes the aged communication to an immediate workflow; and a plurality of desktops for use by designated agents that send responses to customers, said desktops adapted such that the aged communication is displayed on a desktop of a first designated agent after receiving the aged communication from the immediate workflow, wherein the first designated agent provides an immediate response to the aged communication on the desktop, and further wherein the escalation service escalates an immediate communication to the immediate workflow for routing to the first designated agent and wherein the escalation service is operable to check a present threshold for a maximum number of immediate workflows and to delay escalating the customer communications designated as immediate until the number of immediate workflows is below the threshold.

* * * * *

UNITED STATES PATENT AND TRADEMARK OFFICE
CERTIFICATE OF CORRECTION

| | | |
|---|---|---|
| PATENT NO. | : 7,568,001 B2 | Page 1 of 1 |
| APPLICATION NO. | : 10/633018 | |
| DATED | : July 28, 2009 | |
| INVENTOR(S) | : Kevin J. McPartlan et al. | |

It is certified that error appears in the above-identified patent and that said Letters Patent is hereby corrected as shown below:

Column 17, Line 35, delete the portion of text reading "to apeak of" and replace with --to speak of--.

Column 17, Line 40, delete the portion of text reading "pr a produce" and replace with --to produce--.

Column 18, Line 20, delete the portion of text reading "ir a self-service" and replace with --or self-service--.

Column 30, Line 61, delete the portion of text reading "placement an d" and replace with --placement and--.

Column 34, Line 1, delete the portion of text reading "memory x59" and replace with --memory 59--.

Signed and Sealed this

First Day of September, 2009

David J. Kappos
*Director of the United States Patent and Trademark Office*